US 12,229,911 B2

(12) United States Patent
Handa et al.

(10) Patent No.: US 12,229,911 B2
(45) Date of Patent: *Feb. 18, 2025

(54) EDITING A VIRTUAL REALITY SPACE

(71) Applicant: Cluster, Inc., Tokyo (JP)

(72) Inventors: Daiki Handa, Tokyo (JP); Shoma Sato, Tokyo (JP); Hiroyuki Tomine, Tokyo (JP)

(73) Assignee: Cluster, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,568

(22) Filed: Jun. 5, 2023

(65) Prior Publication Data

US 2023/0326160 A1  Oct. 12, 2023

Related U.S. Application Data

(62) Division of application No. 17/968,829, filed on Oct. 19, 2022, now Pat. No. 11,710,288.

(30) Foreign Application Priority Data

Oct. 22, 2021 (JP) ................. 2021-172816

(51) Int. Cl.
*G06T 19/20* (2011.01)
(52) U.S. Cl.
CPC .......... *G06T 19/20* (2013.01); *G06T 2200/24* (2013.01); *G06T 2219/024* (2013.01);
(Continued)
(58) Field of Classification Search
CPC .................................................. G06T 19/20
See application file for complete search history.

(56) References Cited

U.S. PATENT DOCUMENTS 9,218,468 B1  12/2015 Rappaport
11,212,569 B2  12/2021 Kawakami et al.
(Continued)

FOREIGN PATENT DOCUMENTS

JP  2002-049934 A  2/2002
JP  2002-083320 A  3/2002
(Continued)

OTHER PUBLICATIONS

Notice of Reasons for Refusal mailed on Nov. 30, 2021, received for JP Application 2021-172816, 17 pages Including English Translation.
(Continued)

*Primary Examiner* — Charles Tseng
(74) *Attorney, Agent, or Firm* — XSENSUS LLP

(57) ABSTRACT

An editing terminal includes a simple display data acquisition unit that acquires simple display data from an item management server, an item selection processing unit that receives selection of an item from a plurality of items displayed using the simple display data, a three-dimensional data acquisition unit that acquires three-dimensional data of a selected item from the item management server, and an editing processing unit that displays an editing space on an editing screen on the basis of editing space information, receives an input of operation information regarding editing of the editing space using the three-dimensional data of the
(Continued)

selected item, transmits the operation information to an editing server, and displays the editing space after editing on the editing screen.

19 Claims, 15 Drawing Sheets

(52) U.S. Cl.
CPC .................. *G06T 2219/2012* (2013.01); *G06T 2219/2024* (2013.01)

(56) References Cited

U.S. PATENT DOCUMENTS

| | | | |
|---|---|---|---|
| 2002/0052918 A1 | 5/2002 | Rekimoto et al. | |
| 2010/0325154 A1 | 12/2010 | Schloter et al. | |
| 2018/0089899 A1* | 3/2018 | Piemonte | G01C 21/26 |
| 2018/0115681 A1 | 4/2018 | Ohashi | |
| 2018/0121849 A1 | 5/2018 | Torres et al. | |
| 2018/0173401 A1 | 6/2018 | Kim et al. | |
| 2019/0164323 A1 | 5/2019 | Kim | |
| 2021/0035535 A1 | 2/2021 | Kanda | |

FOREIGN PATENT DOCUMENTS

| | | |
|---|---|---|
| JP | 2004-206338 A | 7/2004 |
| JP | 2006-155230 A | 6/2006 |
| JP | 2018-028789 A | 2/2018 |
| JP | 2018-067261 A | 4/2018 |
| JP | 6556301 B1 | 8/2019 |
| JP | 2019-168934 A | 10/2019 |
| WO | 2019/155876 A1 | 8/2019 |

OTHER PUBLICATIONS

Notice of Reasons for Refusal mailed on Apr. 19, 2022, received for JP Application 2021-172816, 7 pages including English Translation.
Decision to Grant mailed on Aug. 2, 2022, received for JP Application 2021-172816, 5 pages including English Translation.
Beever et al., "LevelEd VR: A Virtual Reality Level Editor and Workflow for Virtual Reality Level Design", 2020 IEEE Conference on Games, Aug. 2020, pp. 136-143 (Year: 2020).
He et al., "CollaboVR: A Reconfigurable Framework for Creative Collaboration in Virtual Reality", 2020 IEEE International Symposium on Mixed and Augmented Reality, Nov. 2020, pp. 542-554 (Year: 2020).
Wang et al., "DIY World Builder: An Immersive Level-Editing System", 2013 IEEE Symposium on 3D User Interfaces, Mar. 2013, pp. 195-196 (Year: 2013).
Kia et al., "Spacetime: Enabling Fluid Individual and Collaborative Editing in Virtual Reality", Proceedings of the 31st Annual ACM Symposium on User Interface Software and Technology, Oct. 2018, pp. 853-866 (Year: 2018).

* cited by examiner

EDITING A VIRTUAL REALITY SPACE

CROSS-REFERENCE TO RELATED APPLICATIONS

This application is a divisional of U.S. patent application Ser. No. 17/968,829, filed on Oct. 19, 2022, which claims priority from Japanese Application No. 2021-172816, filed on Oct. 22, 2021, the contents of each are incorporated by reference herein in its entirety.

BACKGROUND

1. Technical Field

The present disclosure relates to a terminal device, a virtual reality space editing system, a program, and a virtual reality space editing method.

2. Description of the Related Art

The virtual reality technology is a technology for allowing a virtual world constructed on a computer to be experienced like a real world. For example, JP 6556301 B2 describes a virtual reality space in which live content corresponding to a video obtained by synthesizing movement of a distributor as movement of a virtual character can be viewed.

SUMMARY

A conventional application for editing a virtual reality space enables editing with a high degree of freedom by an editor. However, on the other hand, there is a problem that a load required for editing the virtual reality space is high for the editor or the editing terminal.

The present disclosure solves the above problem, and an object thereof is to obtain a terminal device, a virtual reality space editing system, a program, and a virtual reality space editing method capable of reducing a load required for editing a virtual reality space.

A terminal device according to the present disclosure includes a simple display data acquisition unit that acquires simple display data from an item management server that has three-dimensional data and the simple display data of each of a plurality of items usable for editing an editing space that is a virtual reality space for editing and manages the plurality of items, an item selection processing unit that receives selection of the items from the plurality of items displayed using the simple display data on an editing screen displayed for editing the editing space, a three-dimensional data acquisition unit that acquires three-dimensional data of the selected item from the item management server, and an editing processing unit that displays the editing space on the editing screen on the basis of editing space information that is three-dimensional data of the editing space, receives an input of operation information regarding an editing operation of the editing space using the three-dimensional data of the selected item, transmits the operation information to an editing server that manages the editing space, and displays the editing space after editing on the editing screen.

A terminal device according to the present disclosure acquires the simple display data from the item management server, receives selection of an item from a plurality of items displayed using the simple display data on an editing screen displayed for editing the editing space, acquires the three-dimensional data of the selected item from the item management server, receives input of operation information regarding editing of the editing space using the three-dimensional data of the selected item, transmits the operation information to the editing server, and displays the editing space after editing on the editing screen. Thus, while a plurality of selectable items can be displayed, it is not necessary to acquire the three-dimensional data of all of the plurality of items in advance, and thus the terminal device according to the present disclosure can reduce the load required for editing the virtual reality space.

DETAILED DESCRIPTION

First Embodiment

Figure 1:
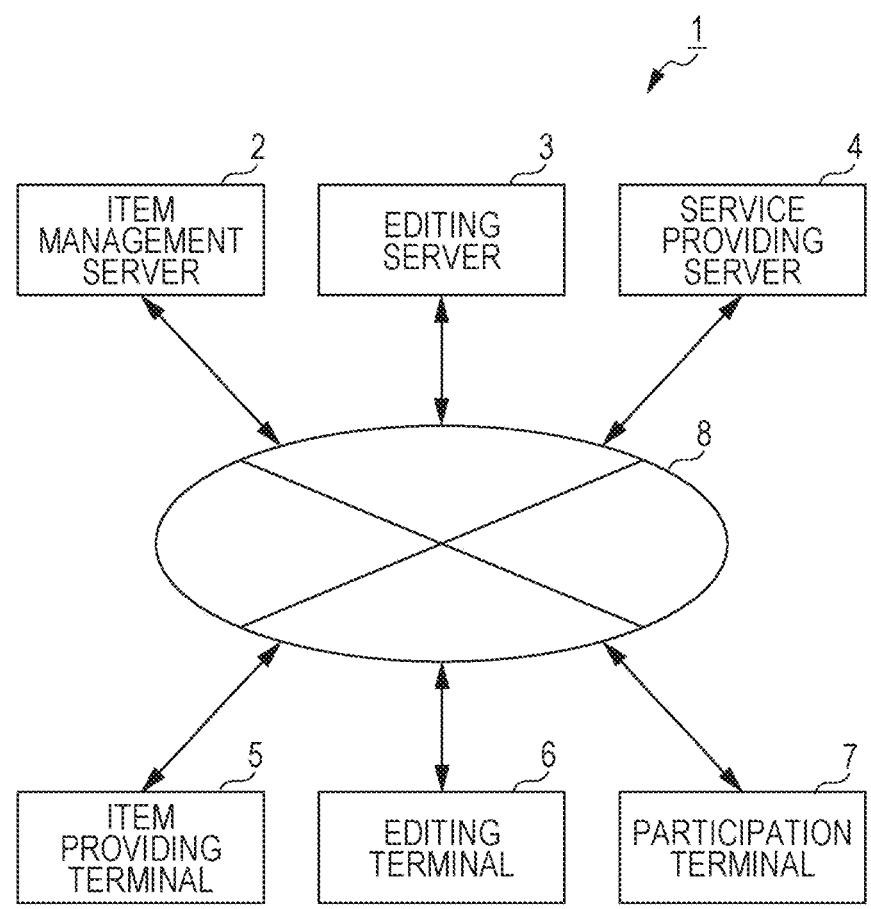
FIG. 1 is a block diagram illustrating a configuration of a virtual reality space editing system according to one or more aspects of the disclosed subject matter.

FIG. 1 is a block diagram illustrating a configuration of a virtual reality space editing system 1 according to a first embodiment. In FIG. 1, the virtual reality space editing system 1 is a system in which an item management server 2, an editing server 3, a service providing server 4, an item providing terminal 5, an editing terminal 6, and a participation terminal 7 are connected via a network 8. The network 8 can use an existing electric communication line, and is, for example, the Internet. The item providing terminal 5, the editing terminal 6, and the participation terminal 7 are terminal devices capable of communicating with the item management server 2, the editing server 3, or the service providing server 4 via the network 8. Note that, in the first embodiment, although the item management server 2, the editing server 3, or the service providing server 4 is an independent server, functions of two or more of these servers may be implemented by one server, or a function of one of these servers may be implemented by a plurality of servers.

The item providing terminal 5, the editing terminal 6, and the participation terminal 7 are, for example, a smartphone, a tablet terminal, or a personal computer (PC). In addition, the editing terminal 6 and the participation terminal 7 may be a head mounted display having a communication function, which is used together with a controller. For example, a user wearing the head mounted display on the head and holding the controller in the hand can operate the virtual reality space displayed on the head mounted display by moving the head or the hand or operating a button or the like of the controller. That is, the editing terminal 6 and the participation terminal 7 are only required to be devices that display the virtual reality space and can operate the virtual reality space. Note that the user in the first embodiment includes an editor who is a user who uses the editing terminal 6 to edit an editing space to be described later and a participant who is a user who uses the participation terminal 7 to participate in the participation space to be described later.

A virtual reality space is a virtual world constructed on a computer. The virtual reality space in the first embodiment includes a virtual reality space for editing in which only editing by an editor is possible and a virtual reality space for participation in which a user other than the editor can participate. Hereinafter, the virtual reality space for editing is referred to as "editing space", and the virtual reality space for participation is referred to as "participation space".

The editing server 3 manages the editing space. More specifically, the editing server 3 manages editing space information that is three-dimensional data of the editing space.

Furthermore, the service providing server 4 manages the participation space. More specifically, the service providing server 4 manages participation space information that is three-dimensional data of the participation space.

The editing terminal 6 is a first terminal device used by the editor for editing the editing space. The participation terminal 7 is a terminal device used for the participant to participate in the participation space.

The editor may become a participant using the same terminal device as the editing terminal 6 as the participation terminal 7, and the user other than the editor may become a participant using the participation terminal 7 that is not used as the editing terminal 6.

Therefore, the editing terminal 6 and the participation terminal 7 may be either the same terminal device as or different terminal devices from each other. Further, the user other than the editor can participate in the participation space as described above, but the editor can also participate as a participant.

Details of the editing terminal 6 will be described later.

The item providing terminal 5 is a second terminal device used by an item provider who provides an item to the item management server 2. The item provider uploads the item from the item providing terminal 5 to the item management server 2 via the network 8. The item uploaded by the item provider to the item management server 2 is, for example, an item created by the item provider using a three-dimensional modeling tool or the like. The editor can edit the editing space by downloading a desired item from the item management server 2 to the editing terminal 6 via the network 8 and arranging the item in the editing space, and the like.

The item provider may become the editor using the same terminal device as the item providing terminal 5 as the editing terminal 6, or a user other than the item provider may become the editor using a terminal device not used as the item providing terminal 5 as the editing terminal 6. Furthermore, the item provider may become the participant using the same terminal device as the item providing terminal 5 as the participation terminal 7, or the user other than the item provider may become the participant using the terminal device not used as the item providing terminal 5 as the participation terminal 7. Therefore, the item providing terminal 5 (second terminal device) and the editing terminal 6 (first terminal device) may be either the same terminal device or different terminal devices from each other, and the item providing terminal 5 and the participation terminal 7 may be either the same terminal device or different terminal devices from each other. Note that the user in the first embodiment may also include the item provider.

The item management server 2 receives the upload of the item from the item providing terminal 5 via the network 8 and manages the uploaded item. Further, the item management server 2 can additionally manage not only items prepared in advance but also items uploaded from various item providers using the item providing terminal 5. Thus, the item management server 2 can manage a wide variety of items. The editing server 3 can create a diverse virtual reality space by editing the editing space using a wide variety of items managed by the item management server 2.

The item management server 2 has three-dimensional data and simple display data of each of a plurality of items that can be used for editing an editing space that is a virtual reality space for editing, and manages the plurality of items. The item is, for example, a virtual three-dimensional stationary object or a moving object that can be arranged in the virtual reality space.

The three-dimensional data of the item is data representing the item in the virtual reality space. The three-dimensional data of the item includes, for example, three-dimensional shape information, size information, color information, and characteristic information of the item. The characteristic information is characteristic information indicating a virtual material of the item, and the characteristic information includes, for example, a parameter indicating a texture of the item and an applied shader, a parameter indicating a sound when the item collides with another object, or a parameter indicating a physical characteristic. In addition, the three-dimensional data of the item may include, for example, information (hereinafter referred to as "item specification information") specifying the item, such as an item-specific ID, as the metadata.

The simple display data of the item is data for simply displaying the appearance of the item to an extent that each item can be identified. The simple display data of the item is, for example, two-dimensional data indicating the appearance of the item or three-dimensional data indicating the appearance of the item. Furthermore, the simple display data of the item includes the item specification information as metadata. In addition, the simple display data of the item may include a character string indicating the item as metadata in addition to the data indicating the appearance of the item. The data amount of the simple display data of the item is smaller than the data amount of the three-dimensional data of the item.

The plurality of items managed by the item management server 2 includes a plurality of items having the same shape as each other and different characteristics indicating colors or virtual materials from each other. For example, the three-dimensional data of the plurality of items having the same three-dimensional shape as each other includes color information different from each other or characteristic information different from each other. The editing server 3 can use a plurality of items having different characteristics indicating colors or virtual materials from each other even if the shapes are the same as each other for editing the editing space, and thus can create a wide variety of virtual reality spaces.

The plurality of items managed by the item management server 2 includes a plurality of background items related to different backgrounds from each other as items that are three-dimensional data of the background of the virtual reality space. The background item is template data for editing a basic background of the virtual reality space. For example, the background item includes an item representing a natural background including plants, rivers, and the like, an item representing an indoor background including walls, floors, and the like, or an item representing an urban background including buildings, roads, and the like. By using the background item in editing the editing space, it is possible to easily edit the basic background of the editing space.

The background item may include initial background template data for creating a background of the virtual reality space from scratch. The initial background template data is, for example, three-dimensional data representing a ground such as a floor and an empty space with the ground as a boundary. By using the initial background template data for editing the editing space, it is possible to create a virtual reality space of a wide variety of backgrounds according to the sensitivity of the editor.

The items managed by the item management server 2 also include a tool item which is a tool for space editing. The tool item is an item capable of editing a space by creating an item or the like by a simple operation using the editing terminal 6, and is, for example, a program module described in a script language. The space editing operation using the tool item is, for example, an operation using a touch panel mounted on a screen of the editing terminal 6. By the creation operation of the item using the tool item, for example, it is possible to create and arrange a river item along an arbitrary curve designated in the editing space, a building item having a random shape in an arbitrary area designated in the editing space, or a plurality of items by copying the designated item in an arbitrary area designated in the editing space.

Furthermore, for example, any area designated in the editing space can be filled with a designated color by another space editing operation using the tool item. The tool item can have a unique three-dimensional shape similarly to the item of a virtual object, and in this case, the item management server 2 also has three-dimensional data and simple display data for the tool item. In editing the editing space, by using the tool item for space editing, it is possible to perform editing with items other than the items managed by the item management server 2 or various types of editing according to the function of the tool, and thus it is possible to create a wide variety of virtual reality spaces.

The editing of the editing space is a process of changing editing space information, which is three-dimensional data of the editing space managed by the editing server 3, by an editing operation in the editing terminal 6. The editing operation includes at least an operation of selecting one item from a plurality of items displayed by using the simple display data and arranging the selected item in the editing space (hereinafter, the operation is referred to as a "new arrangement operation"). In addition, the editing operation may include an operation of selecting an item already arranged in the editing space, moving the item to another position in the editing space, and rearranging the item (hereinafter referred to as "arrangement changing operation"), an operation of selecting an item already arranged in the editing space, rearranging the item in another direction in the editing space (hereinafter referred to as "direction changing operation"), an operation of selecting an item already arranged in the editing space, and deleting the item from the editing space (hereinafter referred to as a "deletion operation"), or the like. In addition, the editing operation may include an operation of changing the size of the item already arranged in the editing space, an operation of changing the color, an operation of changing the material (hereinafter, these are collectively referred to as "operation of changing the size or the like"), or the like. In editing the editing space, upon receiving an input of operation information regarding editing using an item, the editing terminal 6 transmits the operation information to the editing server 3 via the network 8.

The operation information is information regarding an editing operation of the editing space using the three-dimensional data of the selected item. In a case where the editing operation is the new arrangement operation, the selected item is an item selected from a plurality of items displayed using the simple display data. In a case where the editing operation is an operation performed on an item already arranged in the editing space, such as an arrangement changing operation, a direction changing operation, a deletion operation, or an operation of changing the size or the like, the selected item is an item selected from one or a plurality of items already arranged in the editing space.

The operation information includes at least the item specification information for specifying an item selected for the editing operation. In a case where the editing operation is a new arrangement operation, an arrangement changing operation, or a direction changing operation, the operation information includes, in addition to the item specification information, information indicating the position of the item to be arranged in the editing space after each operation and information indicating the direction of the item in the editing space. In a case where the editing operation is any of operations of changing the size and the like, the operation information includes, in addition to the item specification information, size information indicating a size to be applied to the item after the changing operation, color information indicating a color to be applied to the item after the changing operation, or characteristic information indicating a material to be applied to the item after the changing operation.

The transmission of the operation information to the editing server is performed, for example, at a timing when it is determined that each operation is ended once. For example, in a case of the arrangement changing operation, an item already arranged in the editing space can be selected, moved, and rearranged at another position by a drag operation. In this case, it is determined that the editing operation is ended once at a timing when one drag operation is ended after being started, and the operation information is transmitted to the editing server 3. Furthermore, for example, in the case of the arrangement changing operation, it is possible to rearrange the item at another position by inputting a numerical value of each coordinate of the three-dimensional orthogonal coordinate system indicating the position of the item already arranged in the editing space. In this case, it is determined that the editing operation is ended once at the timing when the numerical value of each coordinate is input, and the operation information is transmitted to the editing server 3.

Note that, in a case where the item is generated and arranged using the tool item, the editing operation is an operation (hereinafter, it is referred to as a "generation and arrangement operation") for generating and arranging the item using the tool item. The operation information in this case includes three-dimensional data of the generated item and information on the position and the direction of the item in the editing space.

In a case where a new arrangement operation is performed as the editing operation, when acquiring operation information from the editing terminal 6, the editing server 3 acquires three-dimensional data of an item indicated by the operation information from the item management server 2 via the network 8. Using the acquired three-dimensional data of the item, the editing server 3 edits the editing space information in such a manner that the item is arranged in the editing space at the position and the direction indicated by the operation information. In this manner, the editing server 3 directly acquires the three-dimensional data of the item selected in the editing terminal 6 from the item management server 2 and edits the editing space. Thus, as described later, the editing terminal 6 acquires the three-dimensional data of the selected item from the item management server 2 but does not need to transmit the three-dimensional data of the selected item to the editing server 3, and it is possible to reduce the load required for editing the editing space in the editing terminal 6.

Furthermore, in a case where an operation such as an arrangement changing operation, a direction changing operation, or a deletion operation is performed as the editing operation, the editing server 3 already has three-dimensional data of an item that is a target of the editing operation, and upon acquiring the operation information from the editing terminal 6, the editing server 3 can edit the editing space information on the basis of the three-dimensional data and the operation information. Therefore, also in this case, the editing terminal 6 does not need to transmit the three-dimensional data of the item to the editing server 3, and the load required for editing the editing space in the editing terminal 6 can be reduced.

Furthermore, the editing server 3 can also specify a spatial area displayed on an editing screen of the editing terminal 6 in the editing space as a display target area, and transmit three-dimensional data of the display target area among the editing space information to the editing terminal 6. The display target area is a spatial area displayed on the editing screen in the editing space. The editor can edit any area of the editing space. Since the size of the editing screen is limited, the editor normally causes only a partial spatial area of the editing space, that is, only the display target area to be displayed on the editing screen, and performs the editing operation on the displayed display target area. The editor edits the entire editing space while changing the display target area one after another by operating an operation unit 64 described later, for example. In a case where the editor performs an operation of changing the display target area, the editing terminal 6 transmits coordinate information of the display target area to be displayed next to the editing server 3, and the editing server 3 specifies the display target area on the basis of the coordinate information acquired from the editing terminal 6 and transmits three-dimensional data of the display target area to the editing terminal 6. Furthermore, in a case where the editor performs the editing operation on the display target area, the editing terminal 6 transmits the operation information to the editing server 3, and the editing server 3 edits the display target area and transmits three-dimensional data of the display target area after editing to the editing terminal 6. As described above, the editing server 3 is only required to transmit the information including at least the three-dimensional data of the display target area among the editing space information to the editing terminal 6, and does not need to transmit the entire editing space information. Thus, the editing terminal 6 does not need to store the entire editing space information in the storage device (for example, a storage unit 65 to be described later) and does not need to process the entire editing space information, and can reduce the load required for editing the editing space and the load on the storage device.

The service providing server 4 manages the participation space and provides a service using the participation space via the network 8. The user who uses the service of the participation space can participate in the participation space via the network 8 using the participation terminal 7. Here, the participation in the participation space includes that the avatar corresponding to the participant enters the participation space in addition to that the participant views the participation space.

The virtual reality space editing system 1 is a system used for editing the editing space, and thus may not include the service providing server 4, the item providing terminal 5, and the participation terminal 7 illustrated in FIG. 1. That is, in the virtual reality space editing system 1 including the editing terminal 6, the item management server 2, and the editing server 3, the editing server 3 edits the editing space using the three-dimensional data of each of the editing space and the item, and thus the editing terminal 6 can reduce the load required for editing the editing space.

Figure 2:
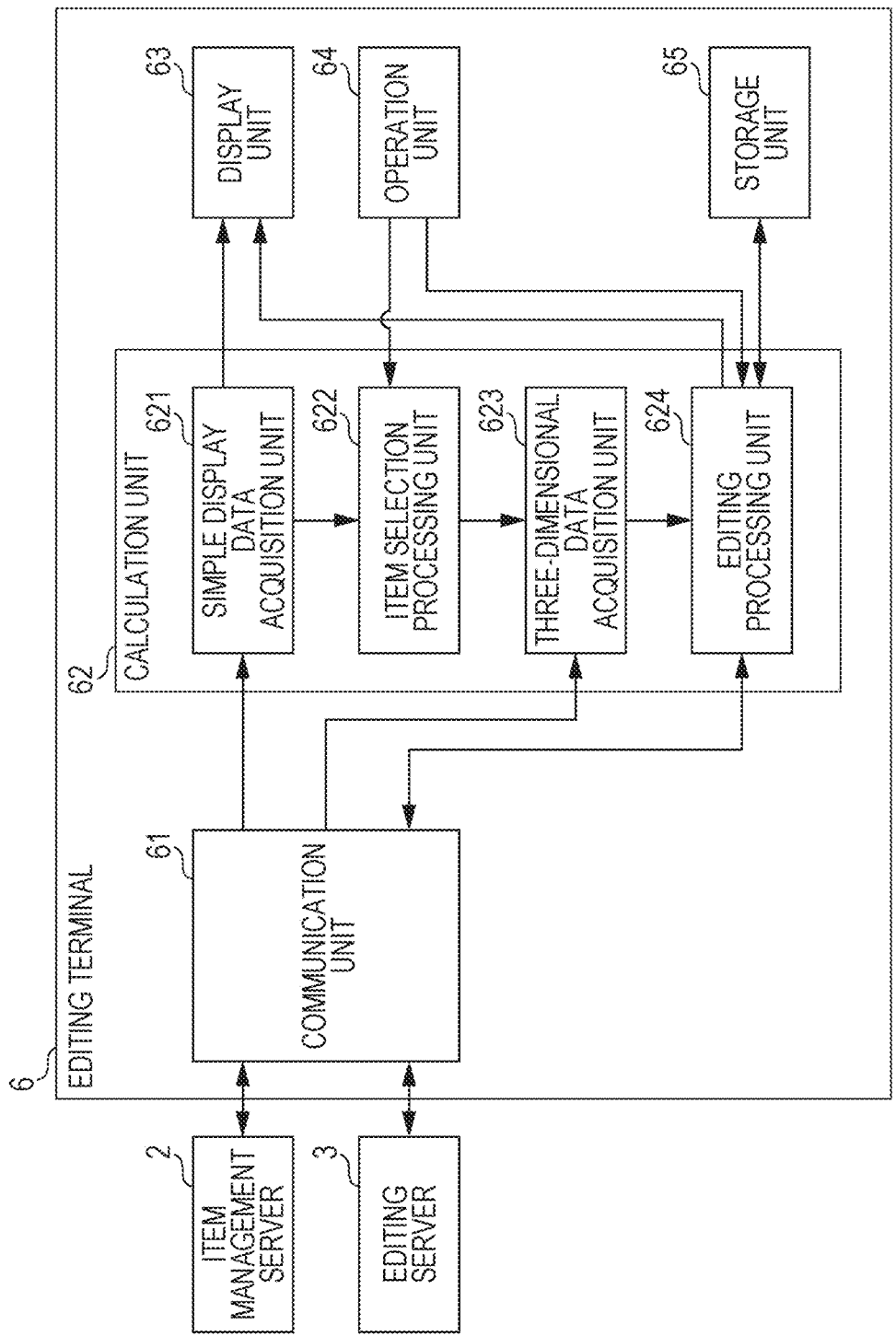
FIG. 2 is a block diagram illustrating a configuration of an editing terminal according to the one or more aspects of the disclosed subject matter.

FIG. 2 is a block diagram illustrating a configuration of the editing terminal 6. As illustrated in FIG. 2, the editing terminal 6 includes a communication unit 61, a calculation unit 62, a display unit 63, an operation unit 64, and a storage unit 65. The communication unit 61 is a communication interface for communicating with other devices. The communication unit 61 is a communication device capable of mobile communication by a communication system such as LTE, 3G, 4G, or 5G, for example, and communicates with another device (FIG. 2 illustrates only the item management server 2 or the editing server 3) such as the item management server 2 or the editing server 3 connected to the network 8. In addition, the communication unit 61 may include a short-range wireless communication unit such as Bluetooth (registered trademark).

The calculation unit 62 controls the overall operation of the editing terminal 6. For example, in a case where an editing application is installed in the editing terminal 6, the calculation unit 62 achieves various functions for editing the editing space by executing the editing application. Furthermore, for example, in a case where the editing application is executed in the editing server 3, the calculation unit 62 achieves various functions for editing the editing space by receiving an instruction from the editing server 3.

The display unit 63 is a display device included in the editing terminal 6. The display unit 63 is, for example, a liquid crystal display (LCD) or an organic electroluminescence (EL) display device. In a case where the editing terminal 6 is a head mounted display, a display method of the display unit 63 is a non-transmissive type.

The operation unit 64 is an input device that receives an operation on the editing screen displayed on the display unit 63. In a case where the editing terminal 6 is a smartphone or a tablet terminal, the operation unit 64 is, for example, a touch panel provided integrally with the screen of the display unit 63. In a case where the editing terminal 6 is a PC, the operation unit 64 is, for example, a mouse or a keyboard. In a case where the editing terminal 6 is a head mounted display, the operation unit 64 is a head mounted display and a controller used together with the head mounted display.

The storage unit 65 is a storage device that stores an application program such as an editing application and stores data used for calculation processing of the calculation unit 62. In the storage unit 65, for example, the editing space information received from the editing server 3 via the network 8 by the communication unit 61 is stored.

The calculation unit 62 includes a simple display data acquisition unit 621, an item selection processing unit 622, a three-dimensional data acquisition unit 623, and an editing processing unit 624. For example, the calculation unit 62 executes the editing application stored in the storage unit 65, thereby implementing the functions of the simple display data acquisition unit 621, the item selection processing unit 622, the three-dimensional data acquisition unit 623, and the editing processing unit 624.

The simple display data acquisition unit 621 acquires the simple display data of the item from the item management server 2. The simple display data of the item is data for simply displaying the appearance of the item to an extent that each item can be identified, and is generated corresponding to each of the plurality of items managed by the item management server 2. The simple display data of the item is, for example, two-dimensional data indicating the appearance of the item or three-dimensional data indicating the appearance of the item, and the data amount of the simple display data of the item is smaller than the data amount of the three-dimensional data of the item. Furthermore, the simple display data of the item includes the item specification information as metadata. In addition, the simple display data of the item may include a character string indicating the item as metadata in addition to the data indicating the appearance of the item. The simple display data acquisition unit 621 simply displays the item on the display unit 63 using the simple display data. The simple display using the simple display data of the item functions as a thumbnail indicating each item to the user in an identifiable manner. In a case where the simple display data of the item includes a character string, the simple display may include the character string. Furthermore, the simple display data acquisition unit 621 outputs the simple display data to the item selection processing unit 622.

The simple display data acquisition unit 621 can acquire the simple display data indicating at least a part of the plurality of items managed by the item management server 2 from the item management server 2. In other words, the simple display data acquisition unit 621 may acquire the simple display data indicating all of the plurality of items managed by the item management server 2 from the item management server 2, or may acquire the simple display data indicating only some of the plurality of items managed by the item management server 2.

For example, the item management server 2 manages category data for displaying a category of each of a plurality of items, and manages the simple display data for each category of items. The simple display data acquisition unit 621 acquires category data from the item management server 2 via the network 8 by the communication unit 61, and displays a plurality of categories on the display unit 63 using the category data.

Figure 3:
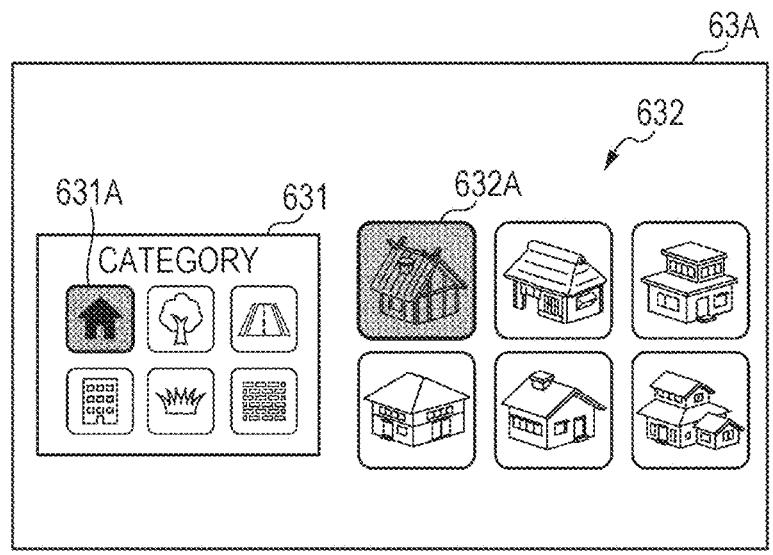
FIG. 3 is a screen view illustrating an editing screen including a thumbnail of an item.
Figure 4:
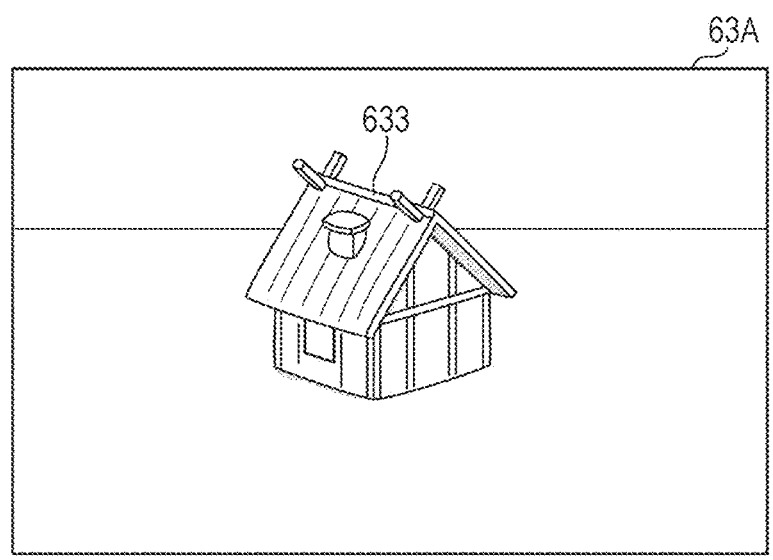
FIG. 4 is a screen view illustrating the editing screen on which an item is arranged.

FIG. 3 is a screen diagram illustrating an editing screen 63A including a thumbnail 632A of the item 633 (see FIG. 4). The thumbnail such as the thumbnail 632A illustrated in a thumbnail list 632 of FIG. 3 is an example in a case where the simple display data of the item is the two-dimensional data. In FIG. 3, a category list 631 is displayed on the editing screen 63A. For example, the editor uses the operation unit 64 such as a touch panel to select a category 631A from the category list 631 as illustrated in FIG. 3. The simple display data acquisition unit 621 acquires the simple display data corresponding to the selected category 631A from the item management server 2 via the network 8 by the communication unit 61. The simple display data acquisition unit 621 displays the thumbnail list 632 of the plurality of items belonging to the category 631A on the editing screen 63A by using the simple display data corresponding to the category 631A.

As described above, in a case where the simple display data acquisition unit 621 acquires the simple display data indicating only some of the plurality of items managed by the item management server 2, the processing load required for editing the editing space can be reduced as compared with a case of acquiring the simple display data for all of the plurality of items managed by the item management server 2.

The item selection processing unit 622 receives selection of an item from a plurality of items displayed on the display unit 63 using the simple display data. For example, the item selection processing unit 622 specifies a simple display position of the item selected using the operation unit 64 from respective simple display positions of the plurality of items on the display unit 63 indicated by the simple display data, thereby receiving the selection of the item. In FIG. 3, the editor uses operation unit 64 to select the thumbnail 632A from thumbnail list 632 displayed on the editing screen 63A. The item selection processing unit 622 outputs the item specification information for specifying the item selected using the operation unit 64 to the three-dimensional data acquisition unit 623.

The three-dimensional data acquisition unit 623 acquires three-dimensional data of the selected item from the item management server 2. The three-dimensional data of the item is data representing the item in the virtual reality space. The three-dimensional data of the item includes, for example, the three-dimensional shape information, the size information, the color information, and the characteristic information of the item. The three-dimensional data of the items can be used to three-dimensionally display the items in the virtual reality space and to develop characteristics of the items in the virtual reality space. The three-dimensional data acquisition unit 623 accesses the item management server 2 via the network 8 by the communication unit 61, transmits the item specification information for specifying the selected item, and acquires three-dimensional data of the item specified by the item specification information among the plurality of items managed by the item management server 2. The three-dimensional data acquisition unit 623 outputs the acquired three-dimensional data of the item to the editing processing unit 624.

Note that each of the plurality of items managed by the item management server 2 may be a free item or a pay item (hereinafter, the item is referred to as a "pay item"). In a case where the item is a pay item, for example, the simple display data included in the item management server 2 includes price information of the item as metadata. Then, the editing terminal 6 that has acquired the simple display data of the pay item performs simplified display including the price of the pay item, so that the editor can check the price of each pay item and then make a decision as to whether or not to purchase and use the pay item.

The editing processing unit 624 displays the editing space on the editing screen of the display unit 63 on the basis of the editing space information, receives input of operation information for the selected item from the operation unit 64, transmits the received operation information to the editing server 3, and displays the editing space after editing on the editing screen. The operation information is information regarding the editing operation of the editing space using the three-dimensional data of the selected item. For example, the operation information includes the item specification information for specifying an item selected for the editing operation, a position of an item arranged in the editing space, and a direction of the item in the editing space.

The editing processing unit 624 acquires the editing space information edited by the editing server 3 on the basis of the operation information, and displays the editing space after editing on the editing screen on the basis of the acquired editing space information. For example, upon receiving the input of the operation information from the operation unit 64, the editing processing unit 624 transmits the operation information to the editing server 3. The editing server 3 edits the editing space on the basis of the operation information received from the editing terminal 6. Then, the editing processing unit 624 displays the editing space after editing on the editing screen on the basis of the editing space information after editing received from the editing server 3. Note that, in a case of receiving the input of the operation information, the editing processing unit 624 may edit the editing space information stored in the storage unit 65 of the editing terminal 6 on the basis of the operation information, display the editing space after editing once on the editing screen, and then display the editing space after editing on the editing screen on the basis of the editing space information after editing by the editing server 3 received from the editing server 3.

FIG. 4 is a screen view illustrating the editing screen 63A on which the item 633 is arranged, and illustrates the item 633 corresponding to the thumbnail 632A selected from the thumbnail list 632 of FIG. 3. For example, upon receiving an input of operation information for arranging the item 633 in the editing space, the editing processing unit 624 transmits the operation information to the editing server 3. The editing server 3 edits the editing space on the basis of the operation information received from the editing terminal 6. The editing processing unit 624 acquires the editing space information edited on the basis of the operation information from the editing server 3, and displays the editing space in which the item 633 is arranged on the editing screen 63A on the basis of the acquired editing space information. As described above, since the editing processing unit 624 acquires the editing space information after editing from the editing server 3, the editor using the editing terminal 6 can check the state of the editing space managed by the editing server 3.

The editing processing unit 624 acquires, from the editing server 3, three-dimensional data of the display target area to be displayed on the editing screen among the editing space information of the editing space managed by the editing server 3 as the editing space information. For example, the editing processing unit 624 causes the communication unit 61 to transmit the coordinate information of the display target area to be displayed on the editing screen to the editing server 3 via the network 8. The editing server 3 specifies the display target area on the basis of the coordinate information acquired from the editing terminal 6, and transmits the three-dimensional data of the specified display target area to the editing terminal 6. The editing processing unit 624 displays the display target area on the editing screen on the basis of the three-dimensional data of the display target area acquired from the editing server 3. The editing server 3 is only required to transmit the information including at least the three-dimensional data of the display target area among the editing space information to the editing terminal 6, and does not need to transmit the entire editing space information. Since the editing processing unit 624 is only required to acquire the editing space information indicating the display target area instead of the entire editing space from the editing server 3, the editing terminal 6 does not need to store the entire editing space information in the storage unit 65 and does not need to process the entire editing space information, and the load required for editing the editing space in the editing terminal 6 and the load on the storage unit 65 can be reduced.

In addition, the editing processing unit 624 may delete, from the storage unit 65, three-dimensional data other than the display target area currently being displayed on the editing screen. For example, in a case where the display target area is changed by the editor performing an operation of changing a spatial area as an editing target in the editing space using the operation unit 64, or the like, the editing processing unit 624 uses the three-dimensional data of the display target area currently being displayed on the editing screen among the editing space information stored in the storage unit 65 to specify three-dimensional data other than the display target area currently being displayed, and deletes the specified three-dimensional data. Thus, the load on the storage unit 65 required for editing the editing space can be reduced.

Figure 5:
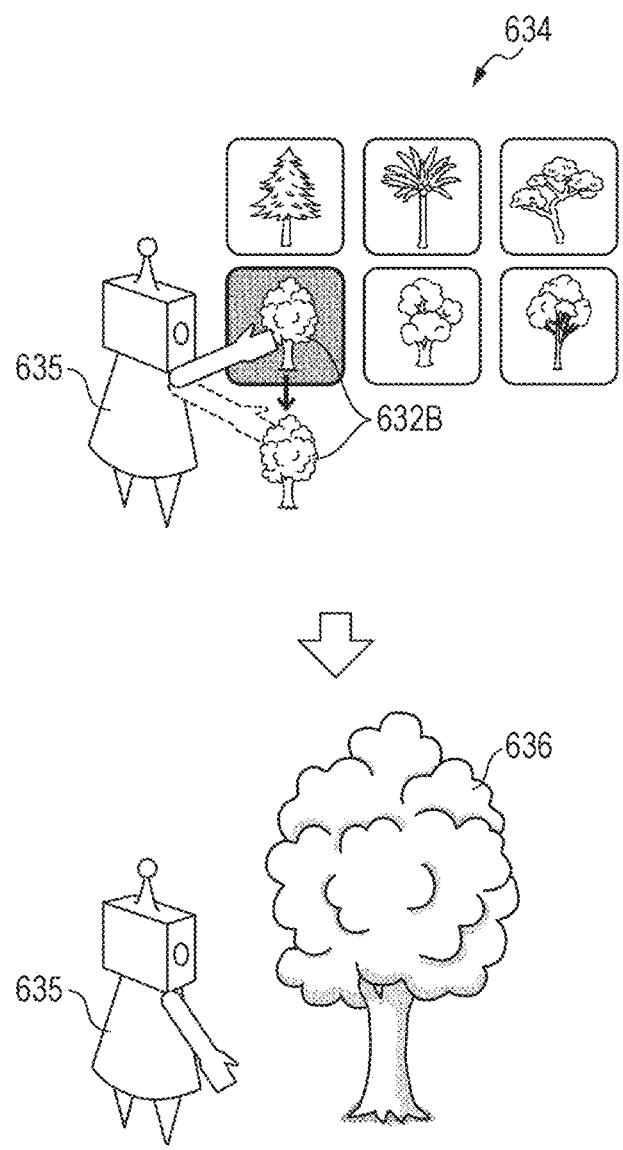
FIG. 5 is a schematic diagram illustrating an outline of editing of an editing space using a simply displayed item.

Although FIG. 3 illustrates an example of the thumbnail in a case where the simple display data of the item is the two-dimensional data, as described above, the simple display data of the item used to display the thumbnail may be the three-dimensional data. In this case, the thumbnail (hereinafter referred to as a "three-dimensional thumbnail") can be treated as a virtual object in the editing space, similarly to the item of an object. For example, FIG. 5 is a schematic diagram illustrating an outline of editing of the editing space using the simply displayed item 636, and illustrates an outline of an item indicated by a three-dimensional thumbnail and an editing process using the item. The upper diagram with an outlined arrow being a boundary in FIG. 5 is a diagram illustrating an outline of an item indicated by a three-dimensional thumbnail and selection processing thereof, and the lower diagram with the arrow being the boundary is a diagram illustrating the editing space in which the selected item 636 is arranged.

As illustrated in the upper diagram of FIG. 5, the simple display data acquisition unit 621 displays a three-dimensional thumbnail list 634 on the editing screen of the display unit 63. Unlike the thumbnail selected by the click operation like the thumbnail displayed using the two-dimensional data, the three-dimensional thumbnail is selected by moving the three-dimensional thumbnail indicating the item that the editor intends to use from the three-dimensional thumbnail list 634. An avatar 635 illustrated in FIG. 5 is an avatar arranged in the editing space and corresponding to the editor, and can be operated by an operation using the operation unit 64.

The avatar 635 moves a three-dimensional thumbnail 632B from the three-dimensional thumbnail list 634 according to the operation using the operation unit 64. When the three-dimensional thumbnail 632B is moved, the item selection processing unit 622 receives the selection of the item corresponding to the three-dimensional thumbnail 632B.

The three-dimensional data acquisition unit 623 acquires the three-dimensional data of the item corresponding to the three-dimensional thumbnail 632B from the item management server 2, and outputs the three-dimensional data to the editing processing unit 624. Using the three-dimensional data acquired from the three-dimensional data acquisition unit 623, the editing processing unit 624 displays the item 636 corresponding to the three-dimensional thumbnail 632B on the editing screen as illustrated in the lower diagram of FIG. 5. By using the three-dimensional thumbnail 632B for item selection, it is possible to give the editor a feeling like actually handling the item in the editing space with the hand.

Figure 6:
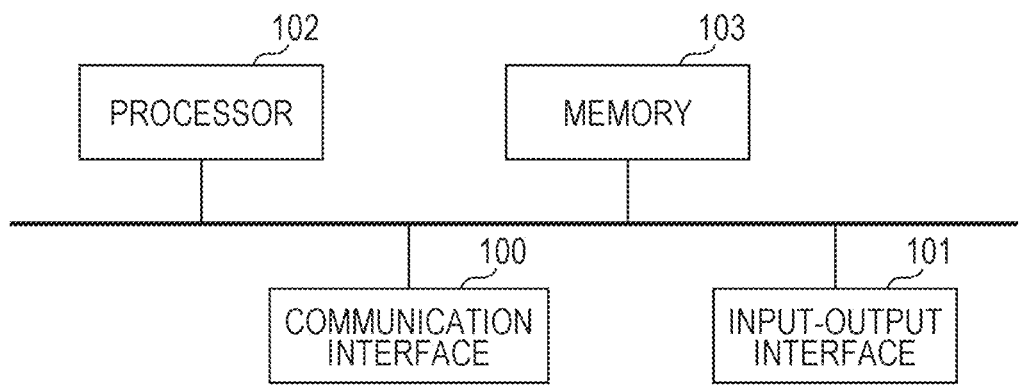
FIG. 6 is a block diagram illustrating a hardware configuration that achieves a function of a calculation unit included in the editing terminal according to one or more aspects of the disclosed subject matter.

FIG. 6 is a block diagram illustrating a hardware configuration that implements the function of the calculation unit 62 included in the editing terminal 6. The function of the editing terminal 6 is achieved by the calculation unit 62. The calculation unit 62 has a communication interface 100, an input-output interface 101, a processor 102, and a memory 103. The functions of the simple display data acquisition unit 621, the item selection processing unit 622, the three-dimensional data acquisition unit 623, and the editing processing unit 624 included in the calculation unit 62 are achieved by these hardware configurations.

The communication interface 100 transmits the editing space information received by the communication unit 61 from the editing server 3 via the network 8 to the processor 102, and transmits the operation information received by the operation unit 64 to the editing server 3 via the network 8. Furthermore, the processor 102 controls display on the display unit 63 via the input-output interface 101, acquires operation information from the operation unit 64, and controls reading and writing of data from and to the storage unit 65.

An application program for achieving respective functions of the simple display data acquisition unit 621, the item selection processing unit 622, the three-dimensional data acquisition unit 623, and the editing processing unit 624 is stored in the storage unit 65. The storage unit 65 is, for example, a semiconductor memory mounted on a smartphone. The processor 102 reads the application program stored in the storage unit 65 via the input-output interface 101, loads the application program into the memory 103, and executes the loaded program. Thus, the processor 102 implements the respective functions of the simple display data acquisition unit 621, the item selection processing unit 622, the three-dimensional data acquisition unit 623, and the editing processing unit 624. The memory 103 is, for example, a random access memory (RAM).

Figure 7:
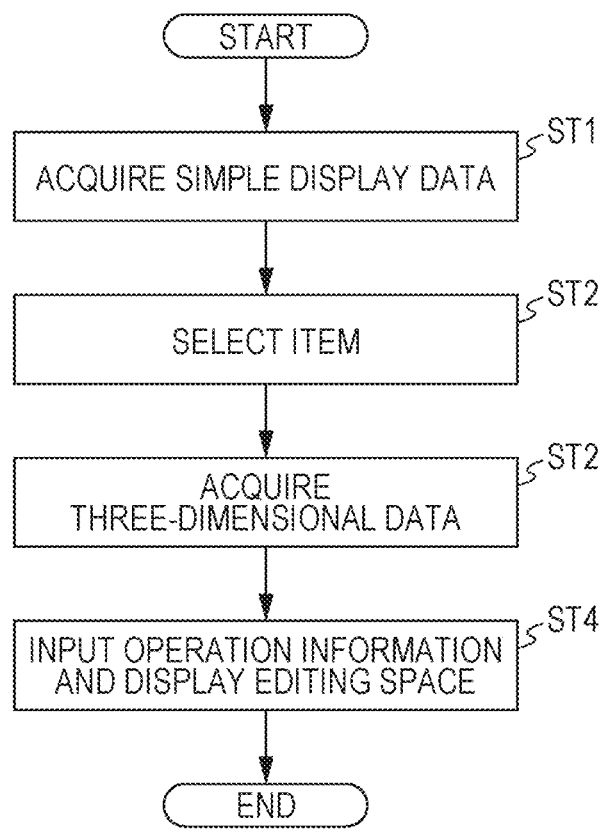
FIG. 7 is a flowchart illustrating a virtual reality space editing method according to one or more aspects of the disclosed subject matter.

FIG. 7 is a flowchart illustrating a virtual reality space editing method according to the first embodiment, and illustrates editing processing of the editing space by the editing terminal 6.

First, the simple display data acquisition unit 621 acquires the simple display data from the item management server 2 via the network 8 by the communication unit 61 (step ST1).

The item selection processing unit 622 receives selection of an item from a plurality of items displayed using the simple display data (step ST2).

The three-dimensional data acquisition unit 623 acquires the three-dimensional data of the item selected by the item selection processing unit 622 from the item management server 2 via the network 8 by the communication unit 61 (step ST3).

The editing processing unit 624 displays the editing screen on the basis of the editing space information, and receives an input of the operation information of the item selected by the item selection processing unit 622 from the operation unit 64. Upon receiving the operation information, the editing processing unit 624 causes the communication unit 61 to transmit the received operation information to the editing server 3 via the network 8, and displays the editing space after editing on the editing screen (step ST4).

As described above, the editing terminal 6 of the first embodiment acquires the simple display data from the item management server 2, receives selection of an item from a plurality of items displayed on the editing screen using the simple display data, acquires the three-dimensional data of the selected item from the item management server 2, receives input of operation information regarding editing of the editing space using the three-dimensional data of the selected item, transmits the operation information to the editing server 3, and displays the editing space after editing on the editing screen. Thus, while a plurality of selectable items can be displayed, it is not necessary to acquire the three-dimensional data of all of the plurality of items in advance, and thus the editing terminal 6 can reduce the load required for editing the virtual reality space.

Note that, in the example of the embodiments so far, in a case of receiving the selection of the item from the plurality of items displayed on the editing screen, the editing terminal 6 acquires the three-dimensional data of the item selected from the item management server 2 for the first time, but for example, the three-dimensional data may be acquired at a similar timing to the acquisition of the simple display data for some items that are generally frequently used among the plurality of items managed by the item management server 2. Also in this case, while a plurality of selectable items can be displayed, it is not necessary to acquire the three-dimensional data of all of the plurality of items in advance, and thus the editing terminal 6 can reduce the load required for editing the virtual reality space.

Hereinafter, a modification example of the first embodiment will be described.

Figure 8:
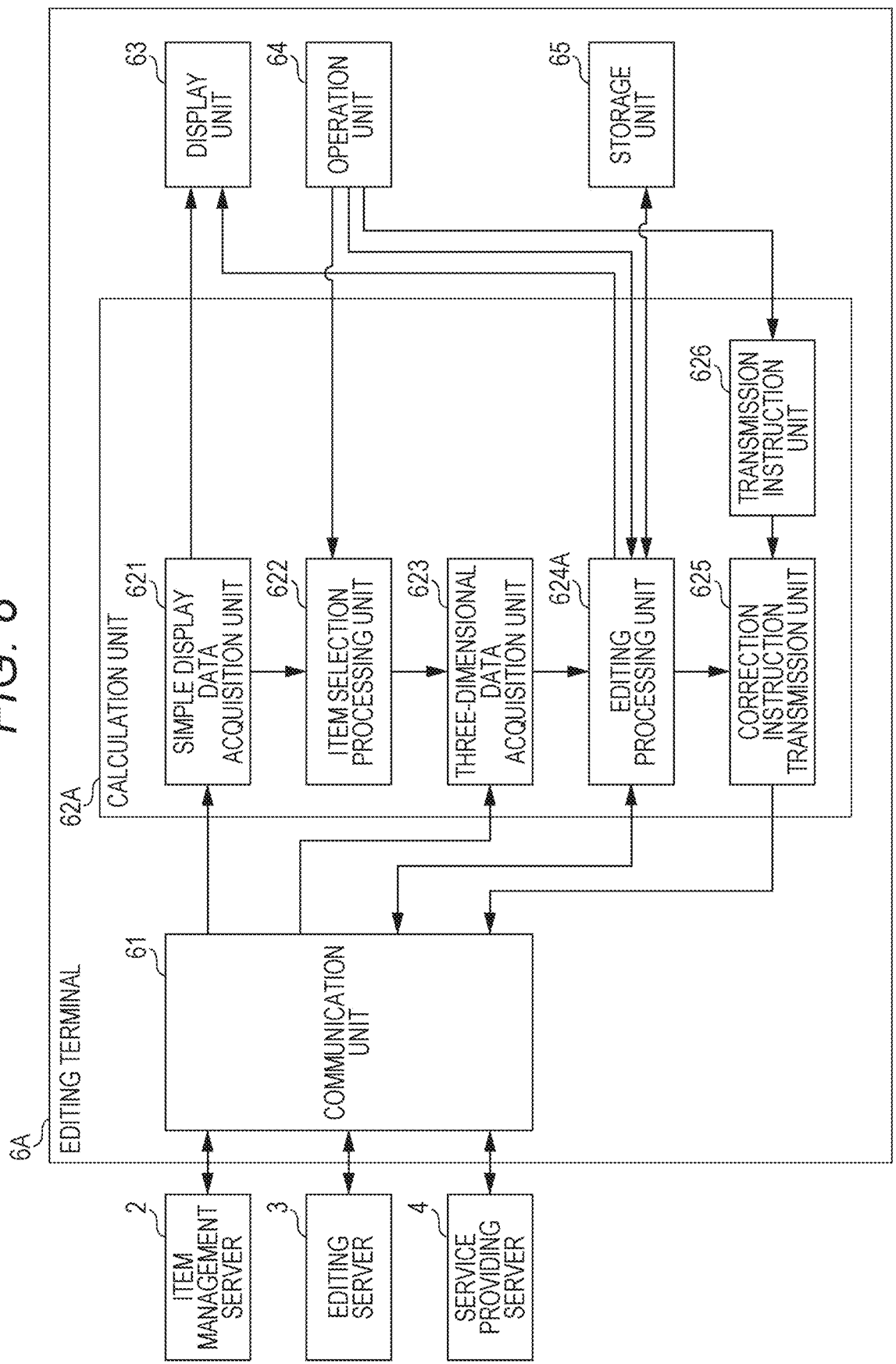
FIG. 8 is a block diagram illustrating a configuration of a modification example of the editing terminal according to one or more aspects of the disclosed subject matter.

FIG. 8 is a block diagram illustrating a configuration of an editing terminal 6A which is a modification example of the editing terminal 6. In FIG. 8, the editing terminal 6A includes the communication unit 61, a calculation unit 62A, the display unit 63, the operation unit 64, and the storage unit 65. The calculation unit 62A controls the overall operation of the editing terminal 6A. Furthermore, the calculation unit 62A executes the editing application installed in the editing terminal 6A to implement functions of the simple display data acquisition unit 621, the item selection processing unit 622, the three-dimensional data acquisition unit 623, an editing processing unit 624A, a correction instruction transmission unit 625, and a transmission instruction unit 626.

The correction instruction transmission unit 625 transmits a correction instruction to correct the participation space information on the basis of the editing space information to the editing server 3 via the network 8 by the communication unit 61. The participation space is a virtual reality space in which users other than the editor can participate. The editor can also participate in the participation space as a participant. The participation space information is information including three-dimensional data of the participation space and three-dimensional data of items arranged in the participation space. The three-dimensional data of the item arranged in the participation space includes the three-dimensional shape information, the size information, the color information, and the characteristic information of the item. Also in the modification example of the first embodiment, the participation space is managed by the service providing server 4. More specifically, the service providing server 4 manages participation space information that is three-dimensional data of the participation space.

The correction of the participation space information means that, after the editing space information is edited on the basis of one or a plurality of pieces of editing information, a change to the participation space is performed on the basis of the editing space information including editing content. The editing content is content of editing indicated by each piece of operation information or content obtained by integrating content of editing indicated by each of a plurality of pieces of operation information. By including the correction instruction transmission unit 625, the editing terminal 6A can correct the participation space according to the editing content of the editing space information at the timing of transmitting the correction instruction. In the modification example of the first embodiment, upon receiving the correction instruction from the editing terminal 6A, the editing server 3 transmits the editing space information managed by the editing server 3 to the service providing server 4. Upon receiving the editing space information from the editing server 3, the service providing server 4 replaces the received editing space information with the participation space information that has been managed by the service providing server 4 so far as new participation space information. In this way, the participation space information is corrected.

The editing server 3 may store a history of the editing content which is a difference between the participation space information managed by the service providing server 4 and the editing space information managed by the editing server 3 before the correction. The history of the editing content indicates editing content that has not been used for correction of the participation space information. In this case, by transmitting the history of the stored editing content to the service providing server 4 after receiving the correction instruction, the service providing server 4 can correct the participation space information on the basis of the received history of the editing content.

The editing server 3 has, for example, the editing space information in an initial state that is three-dimensional data of the editing space in an initial state in which no item is arranged, and transmits the editing space information in the initial state to the editing terminal 6A on the basis of a request from the editing terminal 6A, and the editing terminal 6A displays an editing screen indicating the editing space on the display unit 63 on the basis of the received editing space information in the initial state. Thereafter, the editor edits the editing space information in the initial state using the editing terminal 6A. In a case where desired editing is completed, the editor performs an operation for setting (releasing) the editing space so as to allow the user other than the editor to participate in the editing space, and thereby information obtained by copying the editing space information managed by the editing server 3 is transmitted to the service providing server 4 as the participation space information. When the participation space information is transmitted to the service providing server 4, the participation space indicated by the participation space information is in a state of being managed by the service providing server 4 for the first time. As described above, when the editing space is released as the participation space, the editing server 3 has the editing space information having the same content as the participation space information of the participation space managed by the service providing server 4. However, there is a case where the editor further edits the editing space using the editing terminal 6A after the release, and in this case, the participation space information managed by the service providing server 4 and the editing space information managed by the editing server 3 have different content.

Even in such a case, by including the correction instruction transmission unit 625, the editing terminal 6A can correct the participation space according to the editing content of the editing space information at the timing of transmitting the correction instruction.

For example, upon transmitting the operation information from the editing terminal 6A to the editing server 3, the correction instruction transmission unit 625 transmits a correction instruction for instructing correction according to the operation information to the editing server 3. The editing server 3 edits the editing space information according to the operation information, and transmits the editing space information including the editing content to the service providing server 4, thereby correcting the participation space information. Thus, the editing terminal 6A can correct the participation space based on the editing content of the editing space every time the editing operation is performed. Note that, in this case, the transmission instruction unit 626 is unnecessary.

In a case where the calculation unit 62A has the transmission instruction unit 626, the transmission instruction unit 626 receives a transmission instruction to transmit the correction instruction to the editing server 3. For example, the editing processing unit 624A displays a transmission instruction button for transmitting the correction instruction to the editing server 3 by an operation of the editor on the editing screen, and the transmission instruction unit 626 receives an operation of the transmission instruction button using the operation unit 64. When the transmission instruction unit 626 receives the operation of the transmission instruction button, the correction instruction transmission unit 625 transmits the correction instruction to the editing server 3. Thus, the editing terminal 6A can perform correction of the participation space based on the editing content of the editing space information at a timing intended by the editor.

The editing processing unit 624A can display the editing space on the basis of the editing space information, and can display the participation space on the basis of the participation space information. For example, the editing processing unit 624A displays the editing screen on the display unit 63 using the editing space information, and displays the screen of the participation space on the display unit 63 using the participation space information. The editing terminal 6A can acquire the participation space information from the service providing server 4. Furthermore, the editing processing unit 624A can switch and display the editing space and the participation space on the display unit 63. Thus, the editor can visually recognize the editing space as the editing target and the participation space corresponding thereto on the display unit 63.

Figure 9:
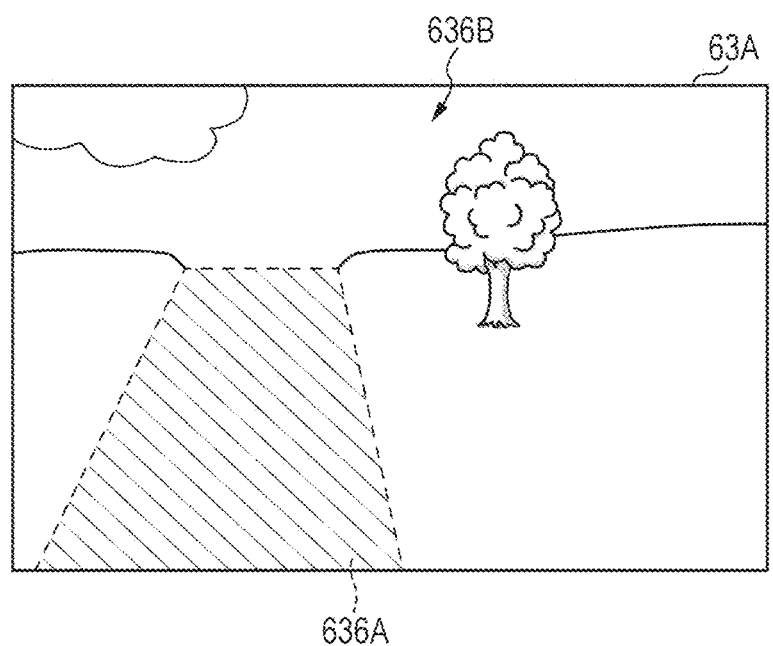
FIG. 9 is a screen view illustrating an example of the editing screen.

Furthermore, the editing processing unit 624A can display the editing content already used for correction of the participation space and the editing content not yet used for correction of the participation space in the editing space on the editing screen in a distinguished manner. FIG. 9 is a screen diagram illustrating an example of the editing screen 63A. In the editing screen 63A illustrated in FIG. 9, an editing area 636A corresponds to editing content not yet used for correction of the participation space, and an editing area 636B other than the editing area 636A corresponds to the editing content already used for correction of the participation space.

As described above, the editing server 3 may store the history of the editing content which is the difference between the participation space information managed by the service providing server 4 before correction and the editing space information managed by the editing server 3. The history of the editing content indicates editing content that has not been used for correction of the participation space information. For example, by using the history of the editing content, the editing processing unit 624A determines the editing content not used for correction of the participation space information among the editing content of the editing space information, and displays the editing area 636A corresponding to the determined editing content in a distinguished manner from the editing area 636B corresponding to the editing content already used for correction of the participation space information. Examples of a method of distinguishing display include displaying the editing area 636A in a color different from the editing area 636B, displaying the editing area 636A in a blinking manner, or displaying a frame line along the outer shape of the editing area 636A. The editor who has visually recognized the editing screen 63A can easily grasp the editing content already used for correction of the participation space and the editing content not yet used for correction of the participation space.

As described above, the editing terminal 6 according to the first embodiment includes the simple display data acquisition unit 621 that acquires the simple display data from the item management server 2, the item selection processing unit 622 that receives selection of an item from the plurality of items displayed using the simple display data, the three-dimensional data acquisition unit 623 that acquires three-dimensional data of the selected item from the item management server 2, and the editing processing unit 624 that displays the editing space on the editing screen on the basis of the editing space information, receives an input of operation information regarding an editing operation of the editing space using the three-dimensional data of the selected item, transmits the operation information to the editing server 3 that manages the editing space, and displays the editing space after editing on the editing screen 63A. The editing server 3 edits the editing space using the item selected in the editing terminal 6, and the editing terminal 6 displays the editing space after editing on the editing screen. While a plurality of selectable items can be displayed, it is not necessary to acquire the three-dimensional data of all of the plurality of items in advance, and thus the editing terminal 6 can reduce the load required for editing the virtual reality space.

In the editing terminal 6 according to the first embodiment, the simple display data acquisition unit 621 acquires the simple display data indicating at least a part of the plurality of items from the item management server 2. Thus, the simple display data acquisition unit 621 is only required to acquire the simple display data indicating at least a part of the plurality of items managed by the item management server 2, and thus it is possible to reduce the load required for editing the editing space.

In the editing terminal 6 according to the first embodiment, the operation information is information including the item specification information for specifying the selected item, the position of the item arranged in the editing space, and the direction of the item in the editing space. The editing processing unit 624 acquires the editing space information edited by the editing server 3 on the basis of the operation information, and displays the editing space after editing on the editing screen 63A on the basis of the editing space information. Thus, the editor using the editing terminal 6 can check the state of the editing space managed by the editing server 3.

In the editing terminal 6 according to the first embodiment, the editing processing unit 624 acquires, from the editing server 3, three-dimensional data of the display target area displayed on the editing screen 63A among the editing space information of the editing space managed by the editing server 3 as the editing space information. Since the editing processing unit 624 is only required to acquire the editing space information indicating the display target area instead of the entire editing space information from the editing server 3, the editing terminal 6 does not need to store the entire editing space information in the storage device and does not need to process the entire editing space information, and the load required for editing the editing space in the editing terminal 6 and the load on the storage unit 65 can be reduced.

The editing terminal 6 according to the first embodiment includes the storage unit 65 used for editing the editing space. The editing processing unit 624 deletes the three-dimensional data other than the display target area currently being displayed on the editing screen 65A from the storage unit 65. Thus, the load on the storage unit 65 required for editing the editing space can be reduced.

In the editing terminal 6 according to the first embodiment, the plurality of items includes a plurality of items having the same shape as each other and different characteristics indicating colors or virtual materials from each other. Since a plurality of items having different characteristics from each other can be used for editing the editing space even if their shapes are the same as each other, a wide variety of virtual reality spaces can be created. Furthermore, by making the items to be a wide variety of items, the necessity of making the editing application for the virtual reality space multifunctional to enable editing with a high degree of freedom by the editor is reduced, and thus it is possible to reduce the load on the editing terminal 6.

In the editing terminal 6 according to the first embodiment, the plurality of items includes a plurality of background items related to different backgrounds from each other as items that are three-dimensional data of the background of the virtual reality space. By using such a plurality of background items, a wide variety of virtual reality spaces can be created. Furthermore, the editing space can be easily edited by using the background item. Furthermore, by making the background item available, the necessity of making the editing application for the virtual reality space multifunctional to enable editing with a high degree of freedom by the editor is reduced, and thus it is possible to reduce the load on the editing terminal 6.

In the editing terminal 6 according to the first embodiment, the plurality of items includes a tool item that is a tool for space editing. Since it is possible to perform editing of the space such as creating an item other than the existing item in the item management server 2 using the tool item for space editing, it is possible to create a wide variety of virtual reality spaces. Furthermore, by making the tool item available, the necessity of making the editing application for the virtual reality space multifunctional to enable editing with a high degree of freedom by the editor is reduced, and thus it is possible to reduce the load on the editing terminal 6.

The editing terminal 6A according to the first embodiment includes the correction instruction transmission unit 625 that transmits, to the editing server 3, a correction instruction for correcting, on the basis of the editing space information, the participation space information that is three-dimensional data of the participation space that is the virtual reality space in which the user other than the editor is allowed to participate. Thus, the participation space can be corrected on the basis of the editing content of the editing space information at the timing when the correction instruction is transmitted.

In the editing terminal 6A according to the first embodiment, when the editing processing unit 624 transmits the operation information to the editing server 3, the correction instruction transmission unit 625 transmits the correction instruction to the editing server 3.

Thus, the editing terminal 6A can correct the participation space based on the editing content of the editing space information each time the editing operation is performed.

The editing terminal 6A according to the first embodiment includes the transmission instruction unit 626 that receives a transmission instruction to transmit a correction instruction to the editing server 3, and the correction instruction transmission unit 625 transmits the correction instruction to the editing server 3 when the transmission instruction unit 626 receives the transmission instruction. Thus, the editing terminal 6A can perform correction of the participation space based on the editing content of the editing space information at a timing intended by the editor.

In the editing terminal 6A according to the first embodiment, the editing processing unit 624 can display the editing space on the basis of the editing space information, and can display the participation space on the basis of the participation space information that is three-dimensional data of the participation space that is the virtual reality space in which the user other than the editor is allowed to participate. Thus, the editor can visually recognize the editing space as the editing target and the participation space corresponding thereto on the display unit 63.

In the editing terminal 6A according to the first embodiment, the editing processing unit 624 can switch and display the editing space and the participation space. Thus, the editor can visually recognize the editing space as the editing target and the participation space corresponding thereto on the display unit 63.

In the editing terminal 6A according to the first embodiment, the editing processing unit 624 displays the editing content already used for correction of the participation space and the editing content not yet used for correction of the participation space in the editing space in a distinguished manner. Thus, the editor who has viewed the editing screen can easily grasp the editing content already used for correction of the participation space and the editing content not yet used for correction of the participation space.

The virtual reality space editing system 1 according to the first embodiment includes the editing terminal 6 or 6A, the item management server 2, and the editing server 3. While a plurality of selectable items can be displayed, it is not necessary to acquire the three-dimensional data of all of the plurality of items in advance, and thus the editing terminal 6 or 6A can reduce the load required for editing the virtual reality space.

In the virtual reality space editing system 1 according to the first embodiment, the item management server 2 receives upload of the item from the item providing terminal 5 that is the same as or different from the editing terminal 6 or 6A, and manages the item received for upload. Thus, since a wide variety of items is uploaded to the item management server 2, it is possible to give diversity to the participation space by editing the editing space using a wide variety of items. Furthermore, by enabling addition of a wide variety of items, the necessity of making the editing application for the virtual reality space multifunctional to enable editing with a high degree of freedom by the editor is reduced, so that the load on the editing terminal 6 can be reduced.

In the virtual reality space editing system 1 according to the first embodiment, upon acquiring the operation information from the editing terminal 6 or 6A, the editing server 3 acquires the three-dimensional data of the item indicated by the operation information from the item management server 2, and edits the editing space information included in the editing server 3 in such a manner that the item is arranged in the editing space at the position and the direction indicated by the operation information. Thus, the editing terminal 6 does not need to transmit the three-dimensional data of the item to the editing server 3, and the processing load required for editing the editing space in the editing terminal 6 can be reduced.

In the virtual reality space editing system 1 according to the first embodiment, the editing server 3 specifies a spatial area to be displayed on the editing screen of the editing terminal 6 or 6A in the editing space as the display target area, and transmits three-dimensional data of the display target area among the editing space information to the editing terminal 6 or 6A. The editing terminal 6 or 6A does not need to store the entire editing space information in the storage device or to process the entire editing space information, and can reduce the load required for editing the editing space in the editing terminal 6 and the load on the storage unit 65.

The program according to the first embodiment is a program for causing a computer to function as the editing terminal 6 or 6A. In one or more aspects of the disclosed subject matter, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. By the processor of the computer executing the program, the editing terminal 6 or 6A capable of reducing the load required for editing the editing space is achieved.

The virtual reality space editing method according to the first embodiment includes a step in which the simple display data acquisition unit 621 acquires the simple display data from the item management server 2 that has the three-dimensional data of each of the plurality of items and the simple display data and manages the plurality of items, a step in which the item selection processing unit 622 receives selection of an item from the plurality of items displayed using the simple display data, a step in which the three-dimensional data acquisition unit 623 acquires the three-dimensional data of the selected item from the item management server 2, and a step in which the editing processing unit 624 displays the editing space on the editing screen on the basis of the editing space information, receives input of the operation information of the selected item, transmits the operation information to the editing server 3, and displays the editing space after editing on the editing screen. While a plurality of selectable items can be displayed, it is not necessary to acquire the three-dimensional data of all of the plurality of items in advance, and thus the editing terminal 6 or 6A can reduce the load required for editing the virtual reality space.

Second Embodiment

Figure 10:
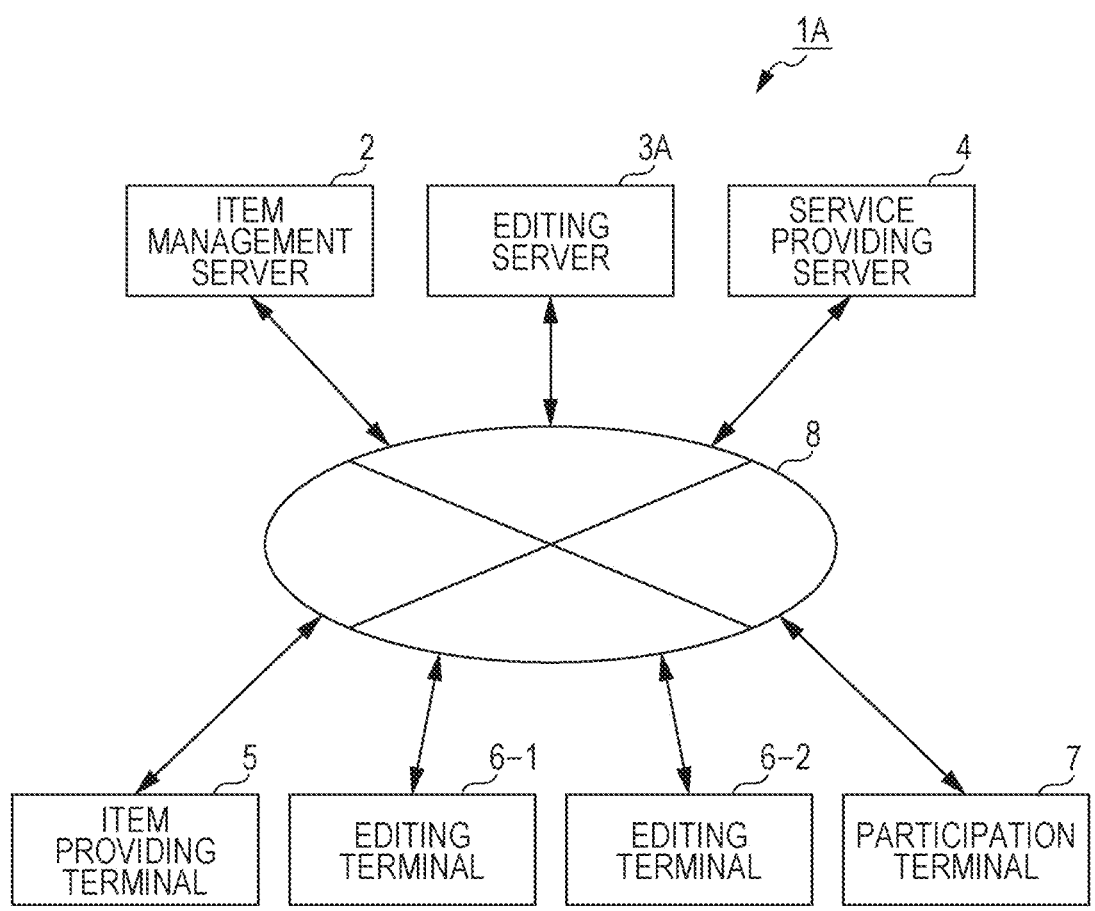
FIG. 10 is a block diagram illustrating a configuration of a virtual reality space editing system according to one or more aspects of the disclosed subject matter.

FIG. 10 is a block diagram illustrating a configuration of a virtual reality space editing system 1A according to a second embodiment. In FIG. 10, the virtual reality space editing system 1A is a system in which the item management server 2, an editing server 3A, the service providing server 4, the item providing terminal 5, an editing terminal 6-1, an editing terminal 6-2, and the participation terminal 7 are connected via the network 8. Furthermore, the editing terminals 6-1 and 6-2 are different first terminal devices from each other used by different editors from each other to edit the same editing space. Note that, here, a case where there are two editing terminals 6-1 and 6-2 as the first terminal device, but there may be three or more first terminal devices that edit the same editing space. Hereinafter, with respect to an editor who edits the editing space using one first terminal device among the plurality of first terminal devices, an editor who edits the editing space using another first terminal device may be referred to as an "cooperative editor". For example, the editor who uses the editing terminal 6-2 is a cooperative editor of the editor who uses the editing terminal 6-1, and the editor who uses the editing terminal 6-1 is a cooperative editor of the editor who uses the editing terminal 6-2. Furthermore, hereinafter, all the editors who use the plurality of first terminal devices to edit the same editing space may be collectively referred to as "cooperative editors".

The item providing terminal 5, the editing terminal 6-1, the editing terminal 6-2, and the participation terminal 7 are terminal devices capable of communicating with the item management server 2, the editing server 3A, or the service providing server 4 via the network 8, and are, for example, smartphones, tablet terminals, or PCs. In addition, the editing terminal 6-1, the editing terminal 6-2, and the participation terminal 7 may be the head mounted display and the controller described in the first embodiment.

Upon acquiring the operation information regarding the editing operation of the editing space information from one or both of the editing terminals 6-1 and 6-2, the editing server 3A acquires the three-dimensional data of the item indicated by the operation information from the item management server 2 via the network 8. The editing server 3A edits the editing space information in such a manner that the item is arranged in the editing space at the position and the direction indicated by the operation information by using the three-dimensional data of the item. The virtual reality space editing system 1A is used for editing (hereinafter referred to as "cooperative editing") the same editing space using the editing terminals 6-1 and 6-2.

For example, when an editor who is a user of the editing terminal 6-1 is a person in charge of editing the editing space, and the person in charge selects the user of the editing terminal 6-2 as a partner to be a cooperative editor, the person in charge transmits access information to the editing terminal 6-2 to the editing server 3A using the editing terminal 6-1. The editing server 3A manages respective pieces of the access information of the editing terminal 6-1 and the editing terminal 6-2 in association with each other, and sets the editing space as the editing target in the editing terminal 6-1 as the editing target of the editing terminal 6-2. Note that, as a method of selecting the partner to be the cooperative editor and setting and managing the access information, any method can be employed within a range in which cooperative editing with only an intended partner is possible.

The editing server 3A specifies the same editing space as the editing target of the editing terminals 6-1 and 6-2 on the basis of the editing space information indicating the editing space as the editing target in the editing terminal 6-1 and the editing space information indicating the editing space as the editing target in the editing terminal 6-2. The editing server 3A edits the editing space on the basis of the operation information acquired from each of the editing terminals 6-1 and 6-2. Thus, the respective editors of the editing terminals 6-1 and 6-2 can cooperatively edit the same editing space.

In a case where the same editing space is being displayed on the editing screen of each of the editing terminals 6-1 and 6-2, the editing server 3A transmits the editing space information after editing to all of the editing terminals 6-1 and 6-2. For example, in a case where the editing terminals 6-1 and 6-2 set the same editing space as the editing target, when an editing operation of the editing space is performed using any of the editing terminals, the editing server 3A transmits the operation information regarding the editing operation to the editing server 3A, and transmits the editing space information after the editing server 3A performs editing on the basis of the operation information to all of the editing terminals 6-1 and 6-2 via the network 8. The editing terminals 6-1 and 6-2 display the editing space after editing on the editing screen on the basis of the editing space information received from the editing server 3A. Thus, the editing terminals 6-1 and 6-2 can share the editing content of the editing space.

The editing server 3A stores the editing space information in which the editing terminals 6-1 and 6-2 are associated with display target areas on the editing screens of the editing terminals 6-1 and 6-2 in the editing space. The display target area is a spatial area being displayed on the editing screen of each of the editing terminals 6-1 and 6-2. The editing server 3A restricts redundant editing of the editing space by the editing terminals 6-1 and 6-2 on the basis of the editing space information.

For example, at the time of editing a part of the display target area on the basis of the operation information acquired from the editing terminal 6-1, in a case where the editing target based on the operation information acquired from the editing terminal 6-2 is the same part in the display target area, the editing server 3A does not receive editing by the editing terminal 6-2 on this part. Moreover, at the time of editing a part of the display target area on the basis of the operation information acquired from the editing terminal 6-1, the editing server 3A may edit the editing space information so that an area corresponding to this part on the editing screen of the editing terminal 6-2 becomes a non-editable area, and transmit the edited space information to the editing terminal 6-2. Thus, the editing server 3A can restrict redundant editing of the editing space by the editing terminals 6-1 and 6-2.

The editing terminal 6-1 displays the display target area of the editing terminal 6-2 in a distinguished manner from areas other than the display target area on the basis of the editing space information. Furthermore, the editing terminal 6-2 displays the display target area of the editing terminal 6-1 in a distinguished manner from the areas other than the display target area on the basis of the editing space information. For example, the editing terminal 6-1 displays an area corresponding to the display area of the editing terminal 6-2 in the display target area on the editing screen in a distinguished manner from other areas. Examples of a method of distinguishing display include displaying the areas in different colors from each other, displaying the area of the cooperative editing partner in a blinking manner, and displaying a frame line along the outer shape of the area of the cooperative editing partner. Thus, the cooperative editor can easily distinguish the areas of the editing spaces being edited by each other on the editing screen.

The editing server 3A specifies, as the display target area, a spatial area of the editing space in which each of the editing terminals 6-1 and 6-2 is displayed on the editing screen, and transmits three-dimensional data of the display target area among the editing space information to each of the editing terminals 6-1 and 6-2. Thus, since the editing terminals 6-1 and 6-2 are only required to acquire the editing space information indicating each display target area instead of the entire editing space information from the editing server 3A, it is not necessary to store the entire editing space information in the storage device or to process the entire editing space information, and the processing load required for editing the editing space and the load of the storage unit can be reduced.

The editing server 3A leaves an editing history for each editor who edits the editing space using the editing terminals 6-1 and 6-2. For example, in the same editing space, in a case where a first editor performs editing related to the first item using the editing terminal 6-1 and a second editor performs editing related to the second item using the editing terminal 6-2, the editing server 3A stores the editing space information after editing related to the first item in association with the first editor, and stores the editing space information after editing related to the second item in association with the second editor.

The editing terminal 6-1 displays the editing space after editing related to the first item and the second item on the editing screen on the basis of the editing space information received from the editing server 3A and associated with each of the first editor and the second editor. Similarly, the editing terminal 6-2 displays the editing space after editing related to the second item and the first item on the editing screen on the basis of the editing space information received from the editing server 3A. By using the editing history, it is possible to display the editing content for each editor on the editing screen in the cooperative editing of the editing space. Furthermore, by leaving the editing history for each editor, in a case where any editor desires to cancel editing performed by himself or herself, it is possible to easily cancel the editing without affecting the editing performed by other editors.

Figure 11:
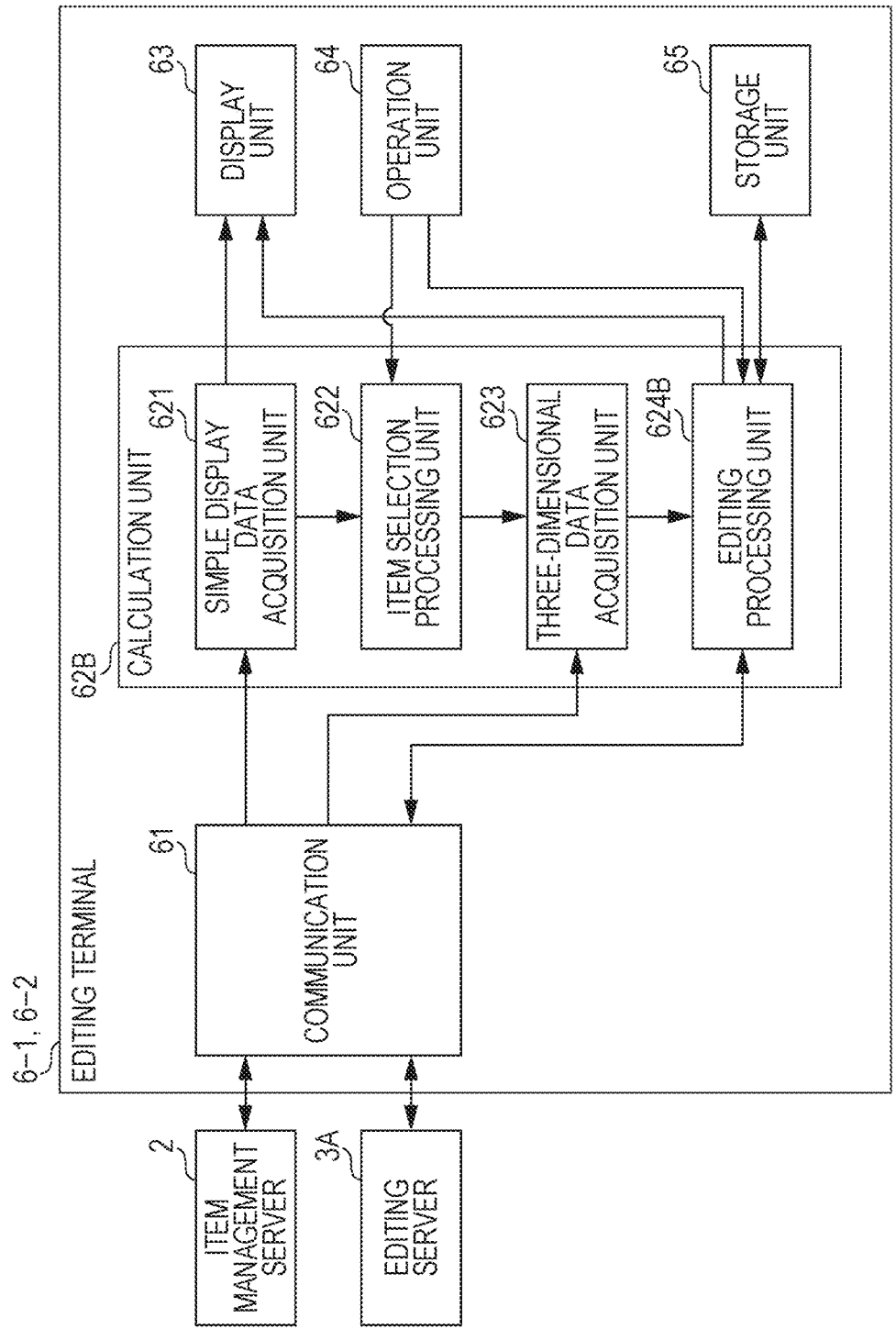
FIG. 11 is a block diagram illustrating a configuration of the editing terminal according to one or more aspects of the disclosed subject matter.

FIG. 11 is a block diagram illustrating a configuration of the editing terminals 6-1 and 6-2. In FIG. 11, the editing terminals 6-1 and 6-2 include the communication unit 61, a calculation unit 62B, the display unit 63, the operation unit 64, and the storage unit 65. The calculation unit 62B includes the simple display data acquisition unit 621, the item selection processing unit 622, the three-dimensional data acquisition unit 623, and an editing processing unit 624B. For example, the calculation unit 62B executes the editing application stored in the storage unit 65, thereby implementing the functions of the simple display data acquisition unit 621, the item selection processing unit 622, the three-dimensional data acquisition unit 623, and the editing processing unit 624B.

The editing processing unit 624B of the editing terminal 6-1 displays the editing space edited by the editing terminal 6-2 in synchronization with generation of the operation information in the editing terminal 6-2 on the basis of the editing space information.

Furthermore, the editing processing unit 624B of the editing terminal 6-2 displays the editing space edited by the editing terminal 6-1 in synchronization with the generation of the operation information in the editing terminal 6-2 on the basis of the editing space information. For example, the editing terminal 6-2 receives an input of operation information regarding the editing operation of the editing space, and transmits the received operation information to the editing server 3A. The editing server 3A edits the editing space on the basis of the operation information from the editing terminal 6-2, and transmits the editing space information after editing to the editing terminal 6-1. The editing terminal 6-1 displays the editing space edited on the basis of the operation information of the editing terminal 6-2. Thus, the editing terminals 6-1 and 6-2 can cooperatively edit the editing space.

Figure 12:
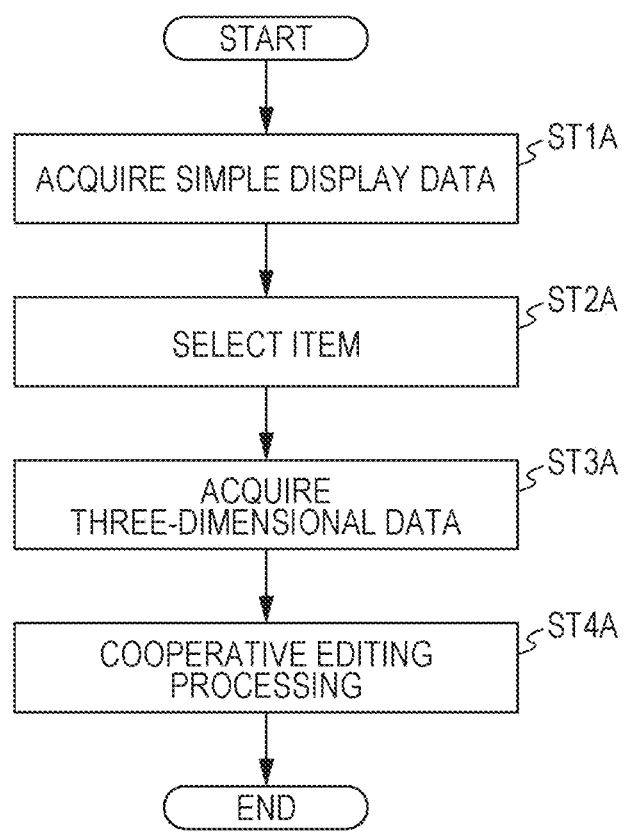
FIG. 12 is a flowchart illustrating a virtual reality space editing method according to one or more aspects of the disclosed subject matter.

FIG. 12 is a flowchart illustrating a virtual reality space editing method according to the second embodiment, and illustrates cooperative editing by the editing terminals 6-1 and 6-2 illustrated in FIG. 10.

In the editing terminals 6-1 and 6-2, the simple display data acquisition unit 621 causes the communication unit 61 to acquire the simple display data from the item management server 2 via the network 8 (step ST1A).

The item selection processing unit 622 receives selection of an item from a plurality of items displayed using the simple display data (step ST2A).

The three-dimensional data acquisition unit 623 acquires the three-dimensional data of the item selected by the item selection processing unit 622 from the item management server 2 via the network 8 by the communication unit 61 (step ST3A).

The editing processing unit 624A displays the editing screen on the basis of the editing space information, and receives an input of the operation information of the item selected by the item selection processing unit 622. In the editing terminals 6-1 and 6-2, the editing processing unit 624A causes the communication unit 61 to transmit the received operation information to the editing server 3A via the network 8, and displays the editing space after cooperative editing on the editing screen (step ST4A).

Figure 13:
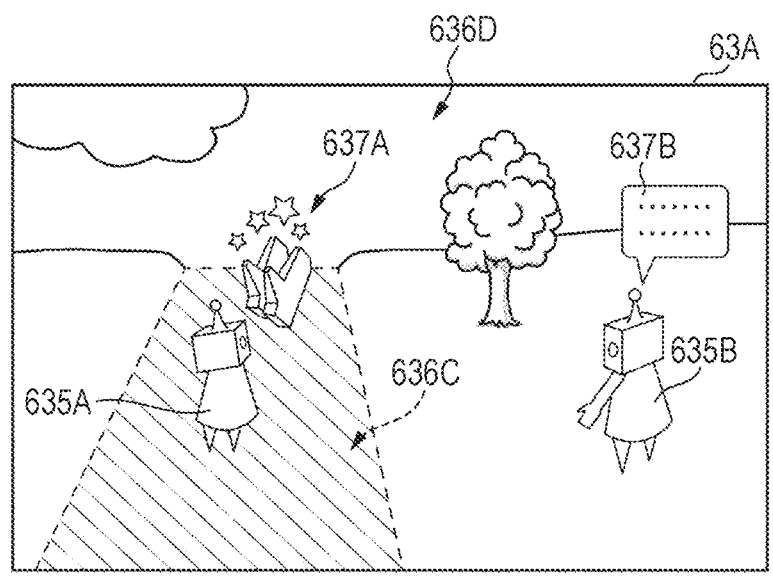
FIG. 13 is a screen diagram illustrating the editing screen in cooperative editing.

FIG. 13 is a screen diagram illustrating the editing screen 63A in cooperative editing, and illustrates the editing screen 63A of the editing terminal 6-1 that performs cooperative editing with the editing terminal 6-2. An avatar 635A is an avatar corresponding to the first editor who uses the editing terminal 6-1, and an avatar 635B is an avatar corresponding to the second editor who uses the editing terminal 6-2. As illustrated in FIG. 13, in addition to the avatar 635B corresponding to the second editor, the editing processing unit 624B included in the editing terminal 6-2 can display the avatar 635A corresponding to the first editor who is a cooperative editor on the editing screen 63A. Similarly, in addition to the avatar 635A corresponding to the first editor, the editing processing unit 624B included in the editing terminal 6-1 can display the avatar 635B corresponding to the second editor who is a cooperative editor on the editing screen 63A.

The editing processing unit 624B of the editing terminal 6-1 transmits, to the editing server 3A, the position information of the avatar 635A for enabling the avatar 635A corresponding to the first editor to be displayed in the editing space displayed on the editing screen of the editing terminal 6-2. Furthermore, the editing processing unit 624B of the editing terminal 6-2 transmits, to the editing server 3A, the position information of the avatar 635B for enabling the avatar 635B corresponding to the second editor to be displayed in the editing space displayed on the editing screen of the editing terminal 6-1.

For example, the editing terminal 6-1 transmits information (hereinafter referred to as "avatar information") indicating the three-dimensional data, the position, the direction, and the action of the avatar 635A in the editing space to the editing server 3A, and the editing server 3A transmits the avatar information of the avatar 635A to the editing terminal 6-2. Furthermore, the editing terminal 6-2 transmits the avatar information of the avatar 635B in the editing space to the editing server 3A, and the editing server 3A transmits the avatar information of the avatar 635B to the editing terminal 6-1. The editing terminals 6-1 and 6-2 display the avatars 635B and 635A in the editing space displayed on the editing screen on the basis of the avatar information of the avatar 635B and the avatar information of the avatar 635A acquired respectively. Note that, here, a case where there are two editing terminals 6-1 and 6-2 is illustrated, but in a case where there are three or more editing terminals, the avatar information transmitted from one editing terminal to the editing server 3A is transmitted from the editing server 3A to all the remaining editing terminals, and each editing terminal displays the avatars of the cooperative editors. Furthermore, when transmitting the avatar information from another editing terminal to each editing terminal, by adding an identifier unique to each editing terminal, the editing server 3A can cause each editing terminal to recognize from which editing terminal the avatar information has been transmitted.

In addition, for example, the editing server 3A may edit the editing space information so that the avatars 635A and 635B are included in the editing space on the basis of the received avatar information acquired from the editing terminals 6-1 and 6-2, and transmit the editing space information after editing to the editing terminals 6-1 and 6-2. The editing terminals 6-1 and 6-2 display the editing space including the avatars 635A and 635B on the editing screen on the basis of the editing space information after editing acquired from the editing server 3A.

Note that the editing processing unit 624B of the editing terminal 6-1 (or 6-2) is only required to transmit the three-dimensional data of the avatar 635A (or 635B) to the editing terminal 6-2 (or 6-1) via the editing server 3A, for example, only when the first editor (or second editor) starts the editing application and participates in the editing space as the avatar 635A (or 635B), or only when the appearance of the avatar 635A (or 635B) is changed, and does not need to continue transmission at all times. In addition, for example, the three-dimensional data of the avatar 635A (or 635B) may be included in the editing server 3A in advance as a default. Furthermore, for example, each editor is only required to be able to recognize the position of the avatar of the cooperative editor, and the direction and the action are not essential. Therefore, the avatar information is only required to have at least the position information. In addition, the frequency of transmission and reception of each avatar information may increase or decrease according to, for example, a moving speed of each avatar or a network environment between the editing terminal and the editing server 3A, or may be a constant cycle.

As described above, the editing processing unit 624B of the editing terminal 6-1 (or 6-2) enables the avatar 635B of the second editor (or the avatar 635A of the first editor) to be displayed in the editing space, so that the first editor and the second editor who are cooperative editors can know the positions of each other in the editing space through the avatars 635A and 635B on the editing screen, and thus the editing terminal 6-1 (or 6-2) can give the editor a real feeling of performing cooperative editing. Furthermore, since the first editor and the second editor can check the respective editing positions by mutually checking the positions of the avatars 635A and 635B on the editing screen, the editing terminal 6-1 (or 6-2) can suppress redundant editing.

Further, the editing processing unit 624B of the editing terminals 6-1 and 6-2 can transmit the communication data input from the editor using each editing terminal to the editing server 3A via the network 8 by the communication unit 61. Then, the editing processing unit 624B of the editing terminal 6-1 (or 6-2) acquires the communication data input by the second editor from the editing terminal 6-2 (or input by the first editor from the editing terminal 6-1) via the editing server 3A, and displays the communication data on the editing screen 63A in association with the avatar 635B (or 635B). The communication data is data indicating communication including a chat, an emotion display, a voice, and the like performed between the avatars corresponding to the cooperative editors. The emotion display is a display indicating a plurality of actions and the like prepared in advance as options for conveying the current feeling and the like, and includes a display of hand clapping, a display of an exclamation mark, a display indicating an action of producing a whistling sound, and the like.

For example, on the editing screen 63A, the avatar 635A displays hand clapping 637A as the emotion display for the editing performed by the avatar 635B. Furthermore, the avatar 635B is talking with the avatar 635A through a chat 637B. In this way, by the cooperative editor communicating through the avatar, it is possible to give the editor the real feeling of performing cooperative editing.

The editing terminal 6-1 displays the display target area of the editing terminal 6-2 in a distinguished manner from areas other than the display target area on the basis of the editing space information. Furthermore, the editing terminal 6-2 displays the display target area of the editing terminal 6-1 in a distinguished manner from the areas other than the display target area on the basis of the editing space information. For example, on the editing screen 63A, the editing processing unit 624B included in the editing terminal 6-1 displays an editing area 636C, which is a display target area in the editing terminal 6-2, in a color different from that of an editing area 636D other than the display target area on the basis of the editing space information. The cooperative editor can easily visually recognize the area of the editing space edited by himself or herself and the area edited by the cooperative editing partner on the editing screen.

Figure 14:
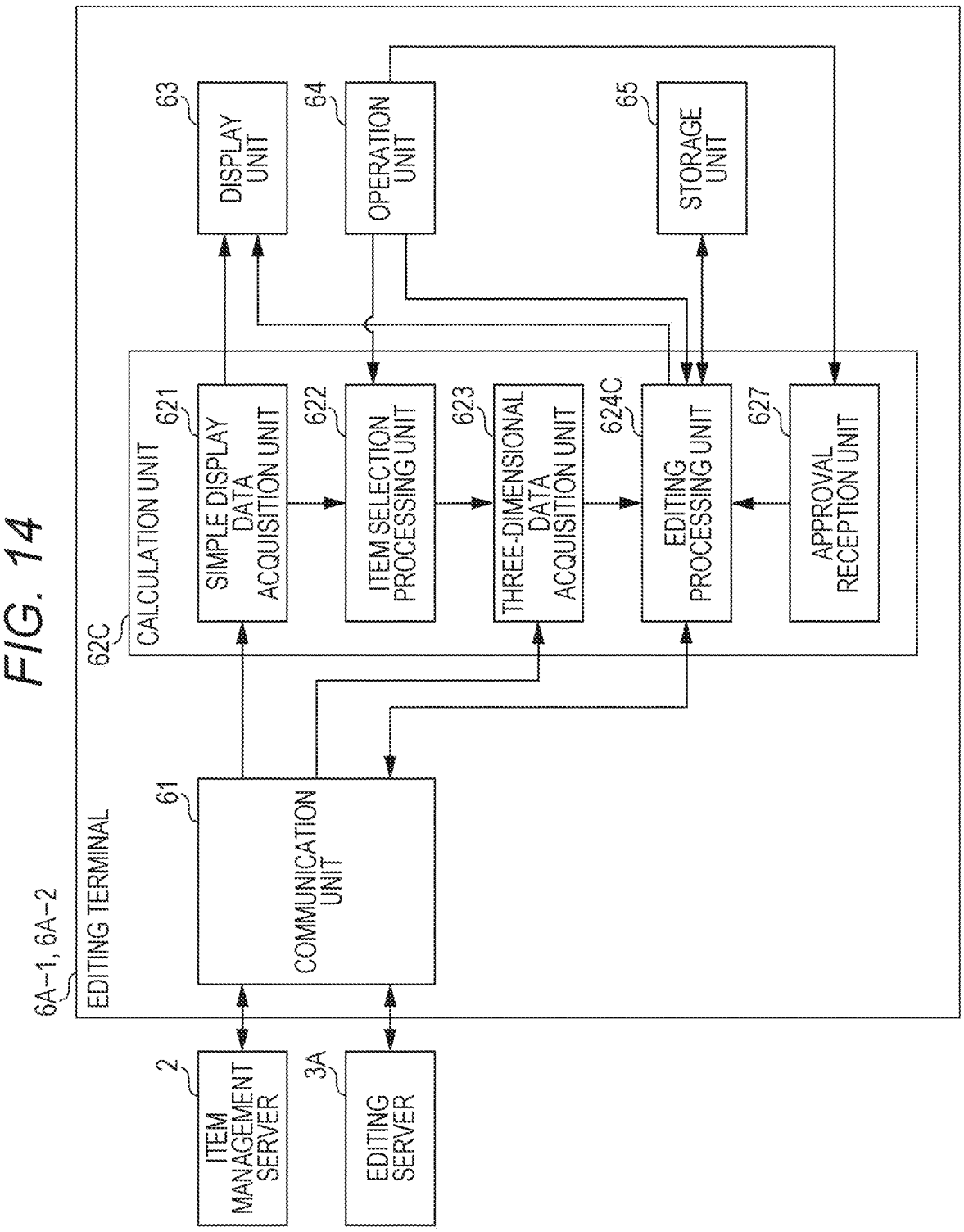
FIG. 14 is a block diagram illustrating a configuration of a modification example of the editing terminal according to one or more aspects of the disclosed subject matter.

FIG. 14 is a block diagram illustrating configurations of editing terminals 6A-1 and 6A-2 which are modification examples of the editing terminals 6-1 and 6-2. In FIG. 14, the editing terminals 6A-1 and 6A-2 include the communication unit 61, a calculation unit 62C, the display unit 63, the operation unit 64, and the storage unit 65. Furthermore, the calculation unit 62C includes the simple display data acquisition unit 621, the item selection processing unit 622, the three-dimensional data acquisition unit 623, an editing processing unit 624C, and an approval reception unit 627. For example, when the calculation unit 62C executes the editing application stored in the storage unit 65, the functions of the simple display data acquisition unit 621, the item selection processing unit 622, the three-dimensional data acquisition unit 623, the editing processing unit 624C, and the approval reception unit 627 are achieved.

The approval reception unit 627 receives an operation to approve or disapprove use of editing content edited by another terminal device for correction of the participation space information. Examples of approval or disapproval operation include an operation using the operation unit 64 or the like on a button image indicating approval or disapproval displayed on the editing screen.

For example, in a case where the editing terminals 6A-1 and 6A-2 perform cooperative editing, the editing processing unit 624C included in the editing terminal 6A-1 receives an input of operation information regarding an editing operation of the editing space, and transmits the operation information to the editing server 3A. The editing server 3A edits the editing space on the basis of the operation information received from the editing terminal 6A-1, and transmits, to the editing terminals 6A-1 and 6A-2, the editing space information indicating that use of the editing content for correction of the participation space is not approved.

In a case where the editing content based on the operation information received by the editing terminal 6A-1 is unapproved, the editing processing unit 624C included in the editing terminal 6A-2 displays the editing content on the editing screen so as to allow recognizing that the editing content is unapproved can be recognized on the basis of the editing space information.

Figure 15:
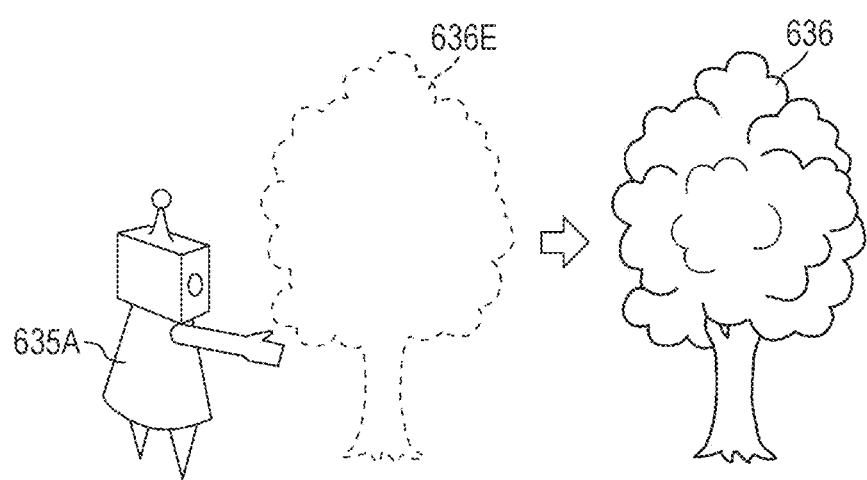
FIG. 15 is a schematic diagram illustrating an outline of cooperative editing processing in a case where editing is approved.

FIG. 15 is a schematic diagram illustrating an outline of the cooperative editing processing in a case where editing is approved. A diagram on the left side with an outlined arrow in FIG. 15 being a boundary illustrates a case where the avatar 635A corresponding to the editor of the editing terminal 6A-1 arranges the item 636 in the editing space. In the left diagram of FIG. 15, use of the editing content for correction of the participation space information is not approved by the editor of the editing terminal 6A-1. Thus, as illustrated in the left diagram of FIG. 15, on the editing screen of the editing terminal 6A-1, the item 636 is displayed as a translucent image 636E indicating non-approval.

The display mode of the editing content on the editing screen is set to be changed according to whether use of the editing space information for correction of the participation space information is approved or disapproved. For example, a diagram on the right side with the outlined arrow in FIG. 15 being a boundary illustrates a display mode of the editing content approved to be used for correction of the participation space information. When the approval reception unit 627 included in the editing terminal 6A-1 receives an operation of approving use of the editing content in which the item 636 is arranged for correction of the participation space information, information indicating approval is output to the editing processing unit 624C.

When acquiring the information indicating approval, the editing processing unit 624C returns the item 636 to normal display so that the translucent image 636E is substantiated on the basis of the editing space information as illustrated in the right diagram of FIG. 15. Thus, the editing content of arranging the item 636 is used at the time of correcting the participation space, and the item 636 is arranged in the participation space. Since the editing terminals 6A-1 and 6A-2 include the approval reception unit 627, editing can be performed while mutual approval is obtained between the cooperative editors. In addition, only some of the cooperative editors may be allowed to give approval. For example, in a case where only the editor who uses the editing terminal 6A-1 can perform approval among two cooperative editors who use the editing terminals 6A-1 and 6A-2, only the editing terminal 6A-1 needs to include the approval reception unit 627. In this case, the editing based on the editing operation using the editing terminal 6A-1 is always used to correct the participation space.

Note that in a case where the approval reception unit 627 receives an operation of disapproving the editing content of arranging the item 636, the editing content may be invalidated. For example, in a case where the approval reception unit 627 included in the editing terminal 6A-1 receives an operation of disapproving use of the editing content in which the item 636 is arranged for correction of the participation space information, information indicating disapproval is output to the editing processing unit 624C. The editing processing unit 624C transmits information indicating disapproval to the editing server 3A via the network 8 by the communication unit 61. When receiving the information indicating disapproval, the editing server 3A edits the editing space information so that the editing content in which the item 636 is arranged is invalidated, and transmits the editing space information after editing to the editing terminals 6A-1 and 6A-2. Thus, the editing content in which the item 636 is arranged is invalidated in the editing terminals 6A-1 and 6A-2.

Figure 16:
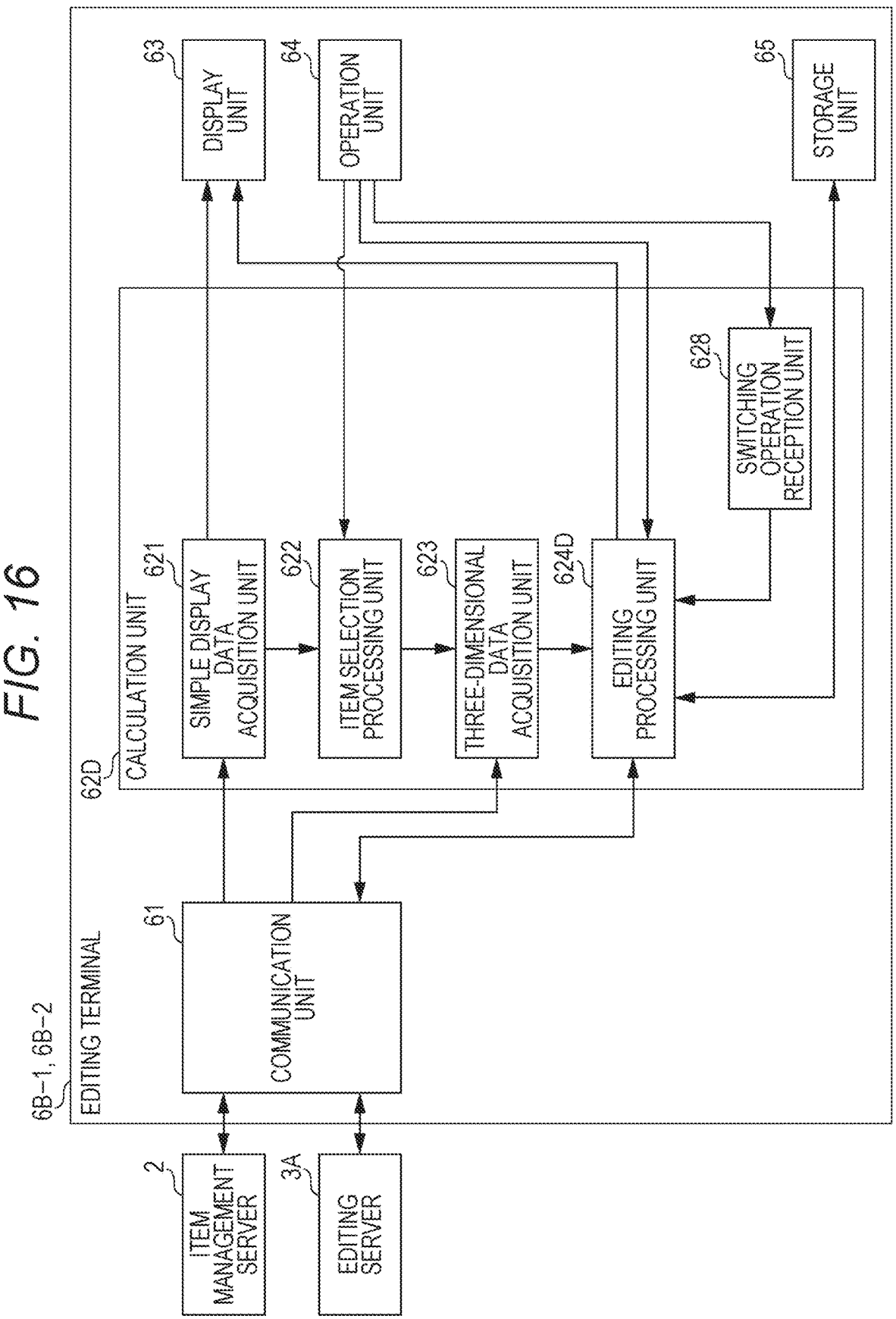
FIG. 16 is a block diagram illustrating a configuration of another modification example of the editing terminal according to one or more aspects of the disclosed subject matter.

FIG. 16 is a block diagram illustrating configurations of editing terminals 6B-1 and 6B-2 which are modification examples of the editing terminals 6-1 and 6-2. In FIG. 16, the editing terminals 6B-1 and 6B-2 include the communication unit 61, a calculation unit 62D, the display unit 63, the operation unit 64, and the storage unit 65. Furthermore, the calculation unit 62D includes the simple display data acquisition unit 621, the item selection processing unit 622, the three-dimensional data acquisition unit 623, an editing processing unit 624D, and a switching operation reception unit 628. For example, the calculation unit 62D executes the editing application stored in the storage unit 65, thereby implementing the functions of the simple display data acquisition unit 621, the item selection processing unit 622, the three-dimensional data acquisition unit 623, the editing processing unit 624D, and the switching operation reception unit 628.

The switching operation reception unit 628 receives a switching operation for switching between an avatar viewpoint that is a viewpoint of viewing the editing space from the avatar and an editing viewpoint for displaying the editing space different from the avatar viewpoint on the editing screen. The editing viewpoint is, for example, a viewpoint of overlooking the editing space including the avatar. In the cooperative editing using the editing terminals 6B-1 and 6B-2, for example, each editing processing unit 624D uses the editing space information acquired from the editing server 3 to create the editing space information for causing a switch button image for switching between the avatar viewpoint and the editing viewpoint to be displayed on the editing screen. The editing terminals 6B-1 and 6B-2 display on the editing screen including the switch button image on the basis of the editing space information.

The editor uses the operation unit 64 such as a touch panel to operate the switch button image displayed on the editing screen. Upon receiving the operation of the switch button image, the switching operation reception unit 628 outputs information indicating the switching operation to the editing processing unit 624D. For example, when the switching operation reception unit 628 included in the editing terminal 6B-1 receives a switching operation for switching the editing space to the avatar viewpoint, the editing processing unit 624D causes the communication unit 61 to transmit information indicating the avatar viewpoint to the editing server 3A via the network 8. Upon receiving the information indicating the avatar viewpoint, the editing server 3A edits the editing space information for displaying the editing space at the avatar viewpoint on the basis of the avatar information indicating the position and movement of the avatar 635A in the editing space, and transmits the editing space information after editing to the editing terminal 6B-1. The editing terminal 6B-1 displays the editing space of the avatar viewpoint on the editing screen on the basis of the editing space information received from the editing server 3A.

Figure 17:
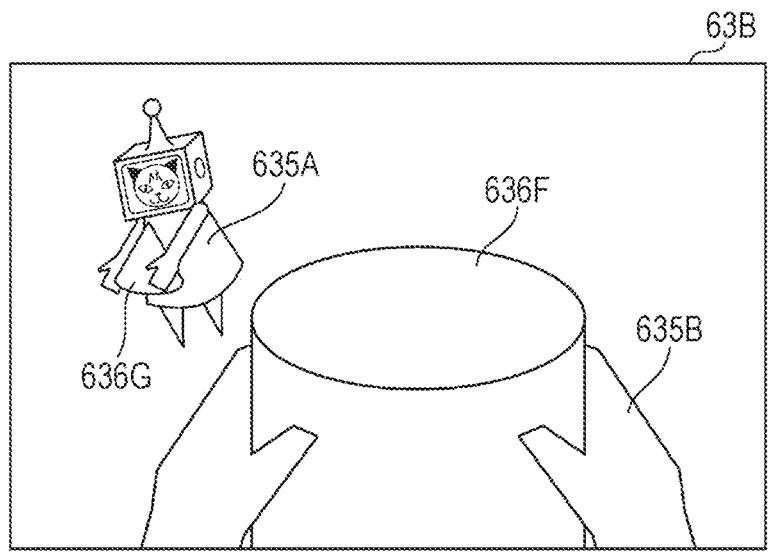
FIG. 17 is a screen view illustrating the editing screen of an avatar viewpoint in cooperative editing.

FIG. 17 is a screen view illustrating an editing screen 63B of the avatar viewpoint in cooperative editing, and illustrates the editing screen 63B in the editing terminal 6B-1 that performs cooperative editing with the editing terminal 6B-2. In FIG. 17, the avatar 635B corresponding to the second editor using the editing terminal 6B-2 performs the action of carrying an item 636F in the editing space, and the avatar 635A corresponding to the first editor using the editing terminal 6B-1 performs the action of carrying an item 636G. On the editing screen 63B, the editing space is displayed from the viewpoint of the avatar 635B. By displaying the editing space from the avatar viewpoint, it is possible to give the editor corresponding to the avatar a realistic feeling in editing the virtual reality space. This is particularly effective in a case where the editing terminals 6B-1 and 6B-2 are head mounted displays.

In a case where the switching operation reception unit 628 included in the editing terminal 6B-2 receives the switching operation for switching the editing space to the editing viewpoint, the editing processing unit 624D causes the communication unit 61 to transmit information instructing the editing viewpoint to the editing server 3A via the network 8. Upon receiving the information instructing the editing viewpoint, the editing server 3A edits the editing space information for displaying the editing space at the editing viewpoint on the basis of the avatar information indicating the position and movement of the avatar 635B in the editing space, and transmits the editing space information after editing to the editing terminal 6B-2. The editing terminal 6B-2 displays the editing space of the editing viewpoint on the editing screen on the basis of the editing space information received from the editing server 3A.

Figure 18:
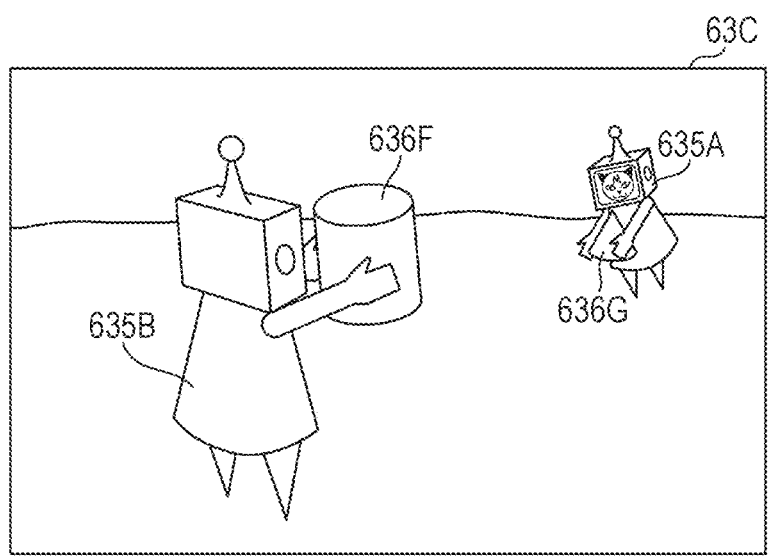
FIG. 18 is a screen view illustrating the editing screen of the editing viewpoint in cooperative editing.

FIG. 18 is a screen view illustrating an editing screen 63C of the editing viewpoint in the cooperative editing, and illustrates a case where the editing screen 63B illustrated in FIG. 17 is switched to the editing screen 63C of the editing viewpoint. In FIG. 18, the editing viewpoint is a viewpoint looking down on the editing space including the avatars 635A and 635B. On the editing screen 63C, an editing space viewed from the editing viewpoint appropriately set in the editing terminal 6B-2 is displayed. By displaying the editing space from the editing viewpoint in this manner, the editor can grasp the entire image of editing of the virtual reality space.

Note that the virtual reality space editing system 1A can perform not only cooperative editing using two editing terminals such as the editing terminals 6-1 and 6-2, the editing terminals 6A-1 and 6A-2, or the editing terminals 6B-1 and 6B-2, but also cooperative editing using three or more editing terminals.

As described above, in the editing terminal 6-1 (or 6-2) according to the second embodiment, the editing processing unit 624A displays the editing space edited by the editing terminal 6-2 (or 6-1) on the basis of the editing space information in synchronization with the generation of the operation information in the editing terminal 6-2 (or 6-1). Thus, the editing terminals 6-1 and 6-2 can cooperatively edit the editing space.

The editing terminal 6A-1 (or 6A-2) according to the second embodiment includes the approval reception unit 627 that receives an operation of approving or disapproving use of the editing content edited by the editing terminal 6A-2 (or 6A-1) for correction of the participation space information that is the three-dimensional data of the participation space that is the virtual reality space in which the user other than the editor is allowed to participate. Thus, editing can be performed while obtaining approval between the cooperative editors.

In the editing terminal 6-1 (or 6-2) according to the second embodiment, the editing processing unit 624B can display the avatar 635B of the second editor (or the avatar 635A of the first editor) in the editing space. Thus, the cooperative editor can know the positions of each other in the editing space through the avatars 635A and 635B on the editing screen, and thus the editing terminal 6-1 (or 6-2) can give the editor the real feeling of performing cooperative editing. Furthermore, the cooperative editor can check the respective editing positions by checking the positions of the avatars 635A and 635B on the editing screen with each other, and thus it is possible to suppress redundant editing.

In the editing terminal 6-1 (or 6-2) according to the second embodiment, the editing processing unit 624B acquires the communication data input by the second editor from the editing terminal 6-2 (or input by the first editor from the editing terminal 6-1) via the editing server 3A, and displays the communication data on the editing screen in association with the avatar 635B of the second editor (or the avatar 635A of the first editor). As the cooperative editor communicates through the avatar, it is possible to give the editor the real feeling of performing cooperative editing.

The editing processing unit 624C of the editing terminal 6B-1 (and 6B-2) according to the second embodiment is capable of displaying the avatar of the editor in the editing space, and includes the switching operation reception unit 628 that receives a switching operation for switching between the avatar viewpoint that is a viewpoint of viewing the editing space from the avatar of the editor and the editing viewpoint for displaying the editing space different from the avatar viewpoint on the editing screen. When the switching operation reception unit 628 receives the switching operation, the editing processing unit 624C switches the avatar viewpoint and the editing viewpoint. By displaying the editing space from the avatar viewpoint, it is possible to give the editor corresponding to the avatar a realistic feeling in editing the virtual reality space. Furthermore, by displaying the editing space from the editing viewpoint, the editor can grasp the entire image of editing of the virtual reality space.

In the virtual reality space editing system 1A according to the second embodiment, the editing server 3A edits the editing space on the basis of the operation information acquired from each of the editing terminals 6-1 and 6-2 displaying the same editing space on the editing screen. Thus, the respective editors of the editing terminals 6-1 and 6-2 can edit the editing space while displaying the same editing space on the editing screen.

In the virtual reality space editing system 1A according to the second embodiment, the editing server 3A transmits the editing space information indicating the editing space after editing to all of the editing terminals 6-1 and 6-2. By displaying the editing space after editing on the editing screen on the basis of the editing space information after editing, the editing terminals 6-1 and 6-2 can share the editing content of the editing space.

In the virtual reality space editing system 1A according to the second embodiment, the editing server 3A stores the editing space information associated with the editing terminals 6-1 and 6-2 and a display target area, which is a spatial area being displayed on the respective editing screens of the editing terminals 6-1 and 6-2 in the editing space, and restricts redundant editing of the editing space by the editing terminals 6-1 and 6-2 on the basis of the editing space information. The editing terminal 6-1 (or 6-2) distinguishes and displays the display target area of the editing terminal 6-2 (or 6-1) from the areas other than the display target area on the basis of the editing space information. Thus, the editing server 3A can restrict redundant editing of the editing space by the editing terminals 6-1 and 6-2. Furthermore, the cooperative editor can easily distinguish the areas of the editing spaces being edited by each other on the editing screen.

In the virtual reality space editing system 1A according to the second embodiment, the editing server 3A specifies a spatial area to be displayed on the editing screen by the editing terminals 6-1 and 6-2 in the editing space as the display target area, and transmits three-dimensional data of the display target area among the editing space information to the respective editing terminals 6-1 and 6-2. Since the editing terminals 6-1 and 6-2 are only required to acquire the editing space information indicating each display target area instead of the entire editing space information from the editing server 3A, it is not necessary to store the entire editing space information in the storage device or to process the entire editing space information, and it is possible to reduce the load required for editing the editing space and the load on the storage unit.

In the virtual reality space editing system 1A according to the second embodiment, the editing server 3A leaves an editing history for each editor who edits the editing space using the editing terminals 6-1 and 6-2. By using the editing history, it is possible to display the editing content for each editor on the editing screen in the cooperative editing of the editing space. Furthermore, by leaving the editing history for each editor, in a case where any editor desires to cancel editing performed by himself or herself, it is possible to easily cancel the editing without affecting the editing performed by other editors.

Note that combinations of the respective embodiments, modifications of any components of the respective embodiments, or omissions of any components in the respective embodiments are possible.

What is claimed is:

1. A first terminal device, comprising:
processing circuitry configured to
acquire display data from an item management server that has three-dimensional data and the display data associated with each of a plurality of items usable for editing an editing space that is a virtual reality space for editing,
acquire the three-dimensional data for predetermined items of the plurality of items in advance,
receive a selection of the plurality items from the plurality of items displayed using the display data on an editing screen displayed for editing the editing space,
in response to receiving a selection of a first item from the plurality of items that has not had the three-dimensional data acquired in advance, acquire the three-dimensional data of the selected first item from the item management server,
display the editing space on the editing screen based on editing space information that is three-dimensional data of the editing space,
receive an input of operation information regarding an editing operation of the editing space using the three-dimensional data of the selected first item,
transmit the operation information to an editing server that manages the editing space;
display the editing space after editing on the editing screen,
cause a participation space to be displayed based on participation space information that is three-dimensional data of the participation space that is a virtual reality space in which a user other than an editor is allowed to participate, and
display editing content already used for correction of the participation space and editing content not yet used for correction of the participation space in the editing space in a distinguished manner.

2. The first terminal device according to claim 1, wherein the processing circuitry is further configured to
acquire, as the editing space information from the editing server, three-dimensional data of a display target area that is a spatial area displayed on the editing screen among the editing space information of the editing space managed by the editing server, and
display the display target area on the editing screen.

3. The first terminal device according to claim 1, wherein the plurality of items includes
items having a same shape as each other and different characteristics indicating colors or virtual materials,
a plurality of background items related to different backgrounds from each other that are three-dimensional data of a background of the editing space, and
a tool item that is a tool for space editing.

4. The first terminal device according to claim 1, wherein the processing circuitry is further configured to
transmit, to the editing server, a correction instruction for correcting, based on the editing space information included in the editing server for managing the editing space, participation space information that is three-dimensional data of a participation space that is a virtual reality space in which a user other than an editor is allowed to participate.

5. The first terminal device according to claim 1, wherein the processing circuitry is further configured to
cause the editing space to be displayed based on the editing space information.

6. The first terminal device according to claim 5, wherein the processing circuitry is further configured to
switch and display the editing space and the participation space.

7. The first terminal device according to claim 1, wherein the processing circuitry is further configured to
display the editing space edited by another terminal device in synchronization with generation of the operation information in the other terminal device based on the editing space information.

8. The first terminal device according to claim 7, wherein the processing circuitry is further configured to
receive an operation of approving or disapproving use of editing content edited by the other terminal device for correction of participation space information that is three-dimensional data of a participation space that is a virtual reality space in which a user other than an editor is allowed to participate.

9. The first terminal device according to claim 7, wherein the processing circuitry is further configured to
enable an avatar of a cooperative editor who is an editor who edits the editing space using the other terminal device to be displayed in the editing space.

10. The first terminal device according to claim 9, wherein the processing circuitry is further configured to
acquire communication data input from the other terminal device by the cooperative editor via the editing server, and
display the communication data on the editing screen in association with the avatar of the cooperative editor.

11. A non-transitory computer-readable medium storing a program for causing a computer to function as the first terminal device according to claim 1.

12. A virtual reality space editing system, comprising:
an item management server;
an editing server; and
a first terminal device comprising processing circuitry configured to
acquire display data from the item management server that has three-dimensional data and the display data associated with each of a plurality of items usable for editing an editing space that is a virtual reality space for editing,
acquire the three-dimensional data for predetermined items of the plurality of items in advance,
receive a selection of the plurality of items from the plurality of items displayed using the display data on an editing screen displayed for editing the editing space,
in response to receiving a selection of a first item from the plurality of items that has not had the three-dimensional data acquired in advance, acquire the three-dimensional data of the selected first item from the item management server,
display the editing space on the editing screen based on editing space information that is three-dimensional data of the editing space;
receive an input of operation information regarding an editing operation of the editing space using the three-dimensional data of the selected first item;
transmit the operation information to the editing server that manages the editing space;
display the editing space after editing on the editing screen, wherein
upon acquiring the operation information from the first terminal device, the editing server acquires the three-dimensional data of the selected first item indicated by the operation information from the item management server, and edits the editing space information included in the editing server in such a manner that the selected first item is arranged in the editing space at a position and a direction indicated by the operation information,
cause a participation space to be displayed based on participation space information that is three-dimensional data of the participation space that is a virtual reality space in which a user other than an editor is allowed to participate, and
display editing content already used for correction of the participation space and editing content not yet used for correction of the participation space in the editing space in a distinguished manner.

13. The virtual reality space editing system according to claim 12, wherein
the item management server receives upload of the selected first item from a second terminal device that is different from the first terminal device, and manages the selected first item that has been received.

14. The virtual reality space editing system according to claim 12, wherein
the editing server specifies a spatial area displayed on the editing screen of the first terminal device in the editing space as a display target area, and transmits three-dimensional data of the display target area among the editing space information to the first terminal device.

15. The virtual reality space editing system according to claim 12, wherein
the editing server edits the editing space based on the operation information acquired from each of a plurality of terminal devices displaying the editing space that is same as displayed on the editing screen, and
the editing server transmits the editing space information, which is the three-dimensional data of the editing space after editing, to each of the plurality of terminal devices.

16. The virtual reality space editing system according to claim 15, wherein
the editing server stores the editing space information in which each of the plurality of terminal devices is associated with a display target area that is a spatial area being displayed on the editing screen of each of the plurality of terminal devices in the editing space, and restricts redundant editing of the editing space by the plurality of terminal devices based on the editing space information, and the first terminal device displays the display target area of another one of the plurality of terminal devices in a distinguished manner from an area other than the display target area of the other one of the plurality of terminal devices based on the editing space information.

17. The virtual reality space editing system according to claim 15, wherein
the editing server specifies a spatial area to be displayed on the editing screen by each of the plurality of terminal devices in the editing space as a display target area, and transmits three-dimensional data of the display target area among the editing space information to each of the plurality of terminal devices.

18. The virtual reality space editing system according to claim 15, wherein
the editing server leaves an editing history for each editor who edits the editing space using the first terminal device.

19. A virtual reality space editing method, comprising:
acquiring display data from an item management server that has three-dimensional data and the display data associated with each of a plurality of items usable for editing an editing space that is a virtual reality space for editing and manages the plurality of items;

receiving a selection of the plurality of items from the plurality of items displayed using the display data on an editing screen displayed for editing the editing space;

in response to receiving a selection of a first item from the plurality of items that has not had the three-dimensional data acquired in advance, acquiring the three-dimensional data of the selected first item from the item management server;

displaying the editing space on the editing screen based on editing space information that is three-dimensional data of the editing space;

receiving an input of operation information regarding an editing operation of the editing space using the three-dimensional data of the selected first item;

transmitting the operation information to an editing server that manages the editing space;

displaying the editing space after editing on the editing screen;

causing a participation space to be displayed based on Participation space information that is three-dimensional data of the participation space that is a virtual reality space in which a user other than an editor is allowed to participate; and displaying editing content already used for correction of the participation space and editing content not yet used for correction of the participation space in the editing space in a distinguished manner.

* * * * *